(12) United States Patent
Park et al.

(10) Patent No.: US 10,140,694 B2
(45) Date of Patent: Nov. 27, 2018

(54) IMAGE DISPLAY APPARATUS

(71) Applicant: LG ELECTRONICS INC., Seoul (KR)

(72) Inventors: Kyeongryeol Park, Seoul (KR); Jeonghyu Yang, Seoul (KR); Hansoo Kim, Seoul (KR); Seungjong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/248,770

(22) Filed: Aug. 26, 2016

(65) Prior Publication Data

US 2017/0061591 A1  Mar. 2, 2017

Related U.S. Application Data

(60) Provisional application No. 62/212,043, filed on Aug. 31, 2015.

(51) Int. Cl.
| | |
|---|---|
| G06T 5/00 | (2006.01) |
| G09G 3/20 | (2006.01) |
| G09G 5/02 | (2006.01) |
| G06T 7/40 | (2017.01) |
| G09G 5/06 | (2006.01) |
| G09G 5/10 | (2006.01) |

(52) U.S. Cl.
CPC ............. *G06T 5/007* (2013.01); *G06T 7/408* (2013.01); *G09G 3/2092* (2013.01); *G09G 5/02* (2013.01); *G09G 5/06* (2013.01); *G09G 5/10* (2013.01); *G06T 2207/20208* (2013.01); *G09G 2320/0271* (2013.01); *G09G 2320/06* (2013.01); *G09G 2320/066* (2013.01); *G09G 2320/0666* (2013.01); *G09G 2320/08* (2013.01); *G09G 2340/0428* (2013.01); *G09G 2340/06* (2013.01); *G09G 2354/00* (2013.01); *G09G 2360/16* (2013.01)

(58) Field of Classification Search
CPC .......... G09G 3/2092; G09G 5/02; G09G 5/06; G09G 2320/0271; G09G 2320/066; G09G 2320/0626; G09G 2320/08; G06T 5/007; G06T 2207/20208
See application file for complete search history.

(56) References Cited

U.S. PATENT DOCUMENTS

| | | | |
|---|---|---|---|
| 8,355,030 B2* | 1/2013 | Lin | G06T 5/009 345/617 |
| 2013/0114000 A1* | 5/2013 | Atkins | H04N 5/20 348/708 |
| 2015/0003749 A1* | 1/2015 | Kim | H04N 19/463 382/232 |

* cited by examiner

*Primary Examiner* — Antonio A Caschera
(74) *Attorney, Agent, or Firm* — KED & Associates, LLP

(57) ABSTRACT

An image display apparatus includes a display, an image receiver to receive a high dynamic range image, and a controller to set luminance information of an image to be displayed based on brightness information of the high dynamic range image and information about a luminance that is displayable on the display and to perform control to display an image having a luminance adjusted based on the set image luminance information. Accordingly, the image display apparatus is capable of converting and displaying the high dynamic range image so as to match the luminance that is displayable on the display.

20 Claims, 38 Drawing Sheets

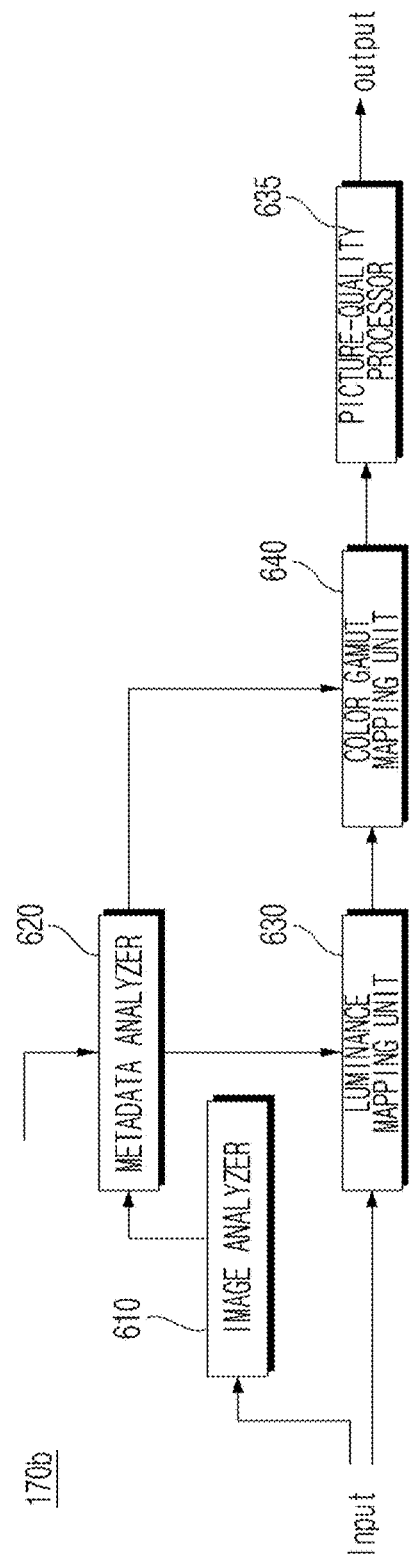

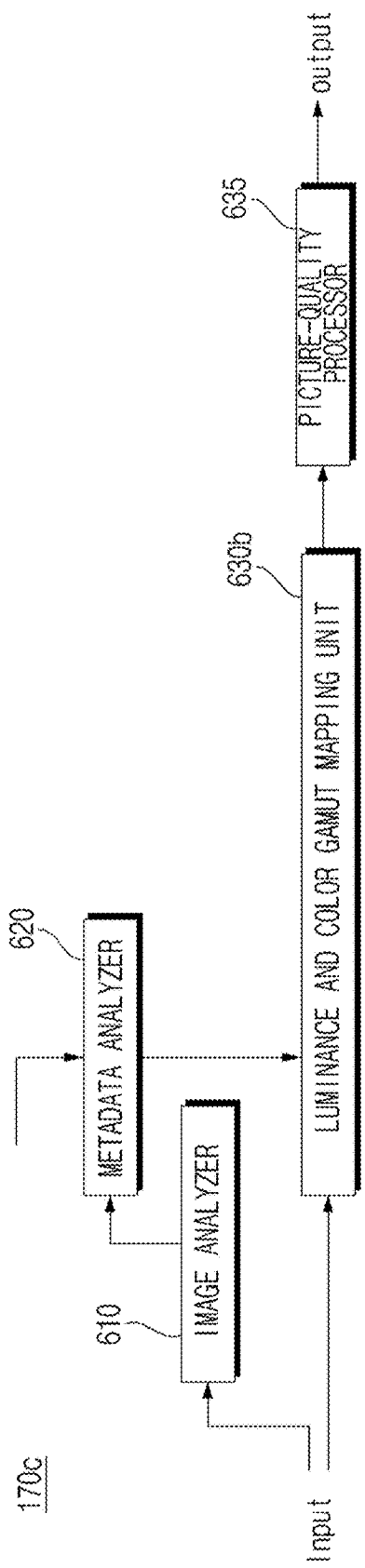

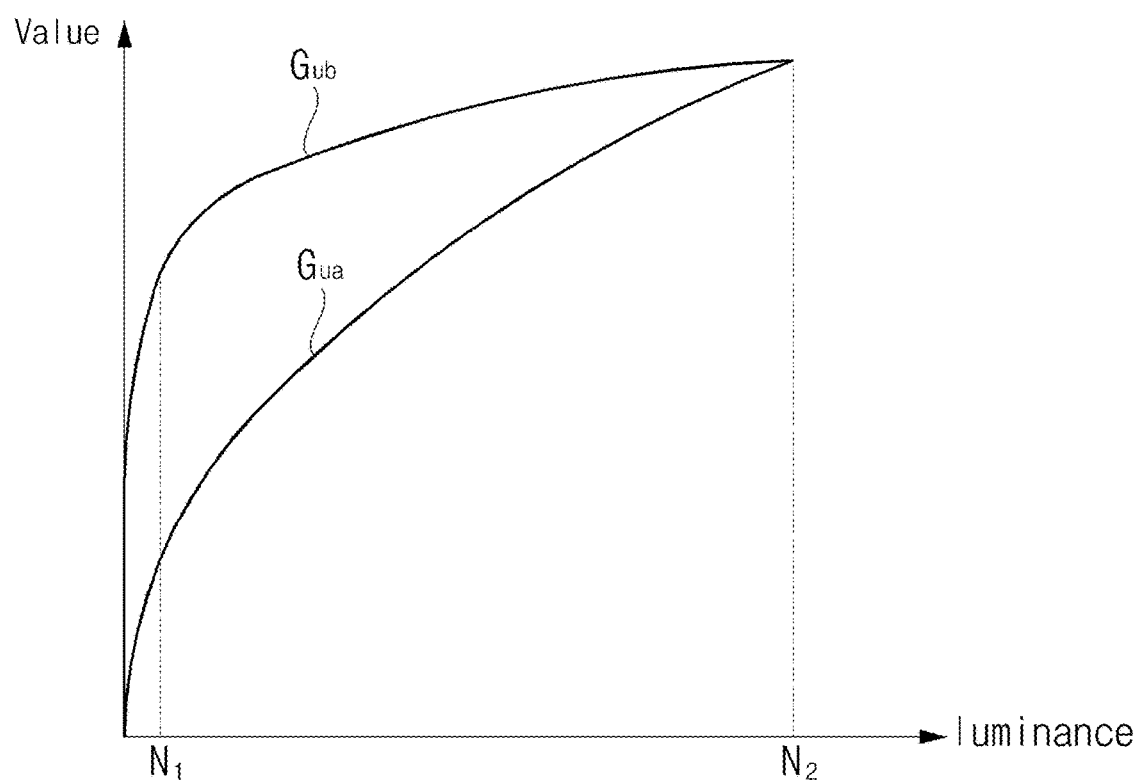

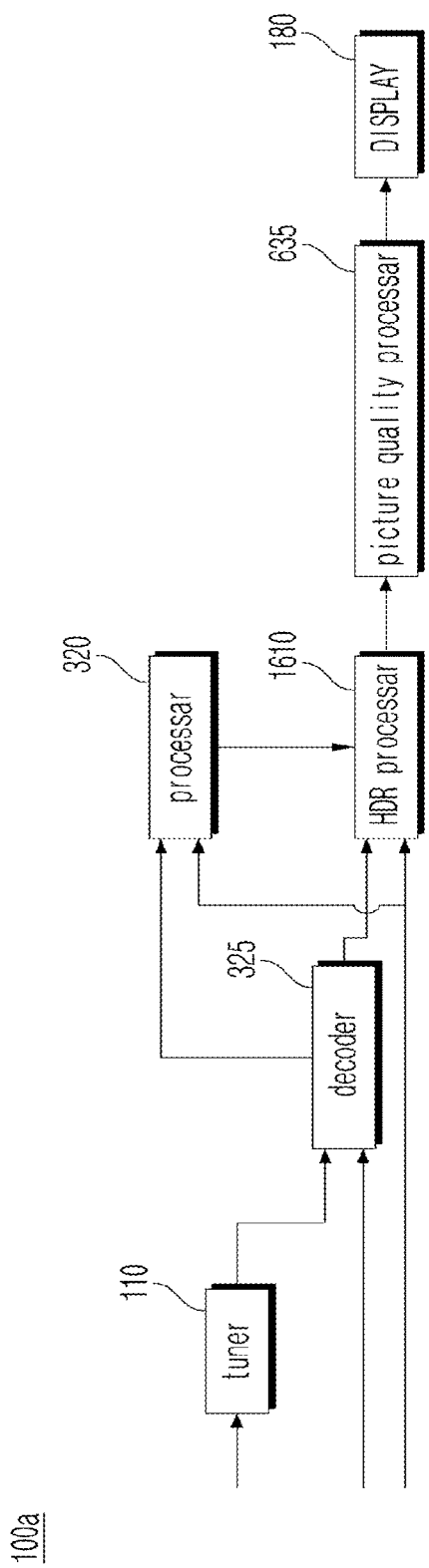

IMAGE DISPLAY APPARATUS

CROSS-REFERENCE TO RELATED APPLICATION

This application claims the priority benefit of U.S. Provisional Application No. 62/212,043 filed on Aug. 31, 2015, the disclosure of which is incorporated herein by reference.

BACKGROUND OF THE INVENTION

1. Field of the Invention

The present invention relates to an image display apparatus, and more particularly, to an image display apparatus capable of converting and displaying an input high dynamic range image so as to match luminance that is displayable on a display.

2. Description of the Related Art

An image display apparatus has a function of providing an image that a user can view. The image display apparatus may receive and display a broadcasting image.

Recently, a high dynamic range (HDR) image has been proposed as a new input in the display apparatus field. For the production, transmission, and display of content, discussions related to standardization of image format, compression and transmission signaling, interface, panel specifications, and the like have been held.

HDR technology represents a departure from the production of an image so that significantly wider brightness range may be shown in a single image that is possible in the related art.

The brightness range is referred to as a dynamic range. A high-quality camera having a wide dynamic range may be used, or two or more cameras may be set so as to respectively cover different dynamic ranges so that a single high dynamic range image is ultimately produced.

SUMMARY OF THE INVENTION

It is one object of the present invention to provide an image display apparatus capable of converting and displaying a high dynamic range image so as to match luminance that is displayable on a display.

It is another object of the present invention to provide an image display apparatus capable of converting and displaying a high dynamic range image so as to match luminance that is displayable on a display and user setting.

In accordance with one aspect of the present invention, the above and other objects can be accomplished by the provision of an image display apparatus including a display, an image receiver to receive a high dynamic range image, and a controller to set luminance information of an image to be displayed based on brightness information of the high dynamic range image and information about a luminance that is displayable on the display and to perform control to display an image having a luminance adjusted based on the set image luminance information.

In accordance with another aspect of the present invention, there is provided an image display apparatus including a display, an image receiver to receive a high dynamic range image, an interface unit to receive luminance setting input with respect to an image to be displayed, and a controller to set luminance information of an image to be displayed based on brightness information of the high dynamic range image, information about a luminance that is displayable on the display, and the luminance setting input, and to perform control to display an image having a luminance adjusted based on the set image luminance information, the controller performing control to reduce a saturation section upon luminance setting as a set luminance level depending on the luminance setting input is increased.

BRIEF DESCRIPTION OF THE DRAWINGS

The embodiments will be described in detail with reference to the following drawings in which like reference numerals refer to like elements wherein:

FIGS. 6A to 16B are views referenced to explain the operating method of FIGS. 5A to 5D.

DETAILED DESCRIPTION OF THE PREFERRED EMBODIMENTS

Hereinafter, the present invention will be described in more detail with reference to the drawings.

With respect to constituent elements used in the following description, suffixes "module" and "unit" are given or mingled with each other only in consideration of ease in the preparation of the specification, and do not have or serve as different meanings. Accordingly, the "module" and "unit" may be used interchangeably.

Figure 1:
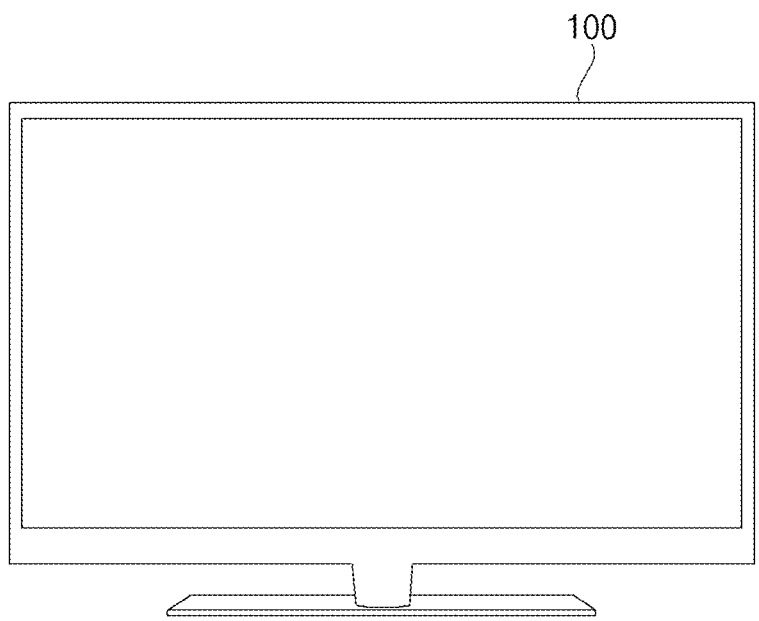
FIG. 1 is a view illustrating the external appearance of an image display apparatus according to an embodiment of the present invention.

FIG. 1 is a view illustrating the external appearance of an image display apparatus according to an embodiment of the present invention.

Referring to FIG. 1, the image display apparatus according to an embodiment of the present invention, designated by reference numeral 100, may include a display 180, an image receiver (see reference numeral 105 in FIG. 2) for receiving a high dynamic range (HDR) image, and a controller (see reference numeral 170 in FIG. 2) for performing control to set luminance information of an image to be displayed based on brightness information of the HDR image and information about luminance that is displayable on the display 180 and to display an image, the luminance of which is adjusted based on the set image luminance information.

Thereby, the input HDR image may be converted and displayed so as to match the luminance that is displayable on the display 180.

Meanwhile, luminance up to 100 nit, which is a standard dynamic range (SDR) level, has emerged in an existing image as a broadcasting standard.

Recent discussions on the standardization of HDR technology have indicated the display of luminance within a wide range up to 1,000 nit or more.

An HDR image has greatly changed image properties compared to an existing SDR image, and requires changes in many parts of an entire system, such as image format, related metadata, compression type, the interface between equipment, high luminance/high contrast ratio panels, and the like.

When the dynamic range of an HDR image is greater than the dynamic range of a display panel, the image display apparatus 100 according to the embodiment of the present invention may perform mapping to match the dynamic range of the image with the dynamic range of the display 180. Accordingly, an image that matches the intention of the creator of the HDR image may be displayed.

The controller 170 may perform control to set color information of an image to be displayed based on color information of the HDR image and information about colors that are displayable on the display 180 and to display an image, the color of which is adjusted based on the set image color information, thereby performing mapping, which corresponds to the information about colors that are displayable on the display 180. In this way, the image that matches the intention of the creator of the HDR image may be displayed.

The controller 170 may perform control to set luminance information of an image to be displayed based on luminance setting input regarding the image to be displayed and to display an image, the luminance of which is adjusted based on the set image luminance information. Thereby, an image that matches the intention of the viewer may be displayed.

The controller 170 may perform control to set color information of an image to be displayed based on color setting input regarding the image to be displayed and to display an image, the color of which is adjusted based on the set image color information. Thereby, an image that matches the intention of the viewer may be displayed.

The controller 170 may perform control to set contrast information of an image to be displayed based on contrast setting input regarding the image to be displayed and to display an image, the contrast of which is adjusted based on the set image contrast information. Thereby, an image that matches the intention of the viewer may be displayed.

Meanwhile, the controller 170 may perform control to set luminance information of an image to be displayed, on a per-image-scene or per-image-frame basis, based on brightness information of the HDR image on a per-image-scene or per-image-frame basis and information about luminance that is displayable on the display 180 and to display an image, the luminance of which is adjusted, on a per-image-scene or per-image-frame basis, based on the set image luminance information. Thereby, the image, the luminance of which is adjusted on a per-image-scene or per-image-frame basis, and which matches the intention of the creator of the HDR image, may be displayed.

The controller 170 may perform control to set luminance information of an image to be displayed, on a per-image-scene or per-image-frame basis, based on luminance setting input regarding the image to be displayed and to display an image, the luminance of which is adjusted, on a per-image-scene or per-image-frame basis, based on the set image luminance information. Thereby, the image, the luminance of which is adjusted on a per-image-scene or per-image-frame basis, and which matches the intention of the creator of the HDR image, may be displayed.

The controller 170 may perform control to extract maximum luminance information from brightness information of the HDR image and to vary a saturation section upon luminance setting based on the maximum luminance information. Accordingly, when the luminance of the HDR image is adjusted, adaptive luminance adjustment is possible.

The controller 170 may control the saturation section upon luminance setting so as to be reduced as the maximum luminance level is increased.

The controller 170 may control the saturation section upon luminance setting so as to be reduced as the set luminance level is increased.

Various methods of operating the image display apparatus 100 described above will be described below in more detail with reference to FIG. 5A and the following drawings.

The image display apparatus 100 of FIG. 1 may be a TV, a monitor, a tablet PC, a mobile terminal, a display apparatus for a vehicle, or the like.

Figure 2:
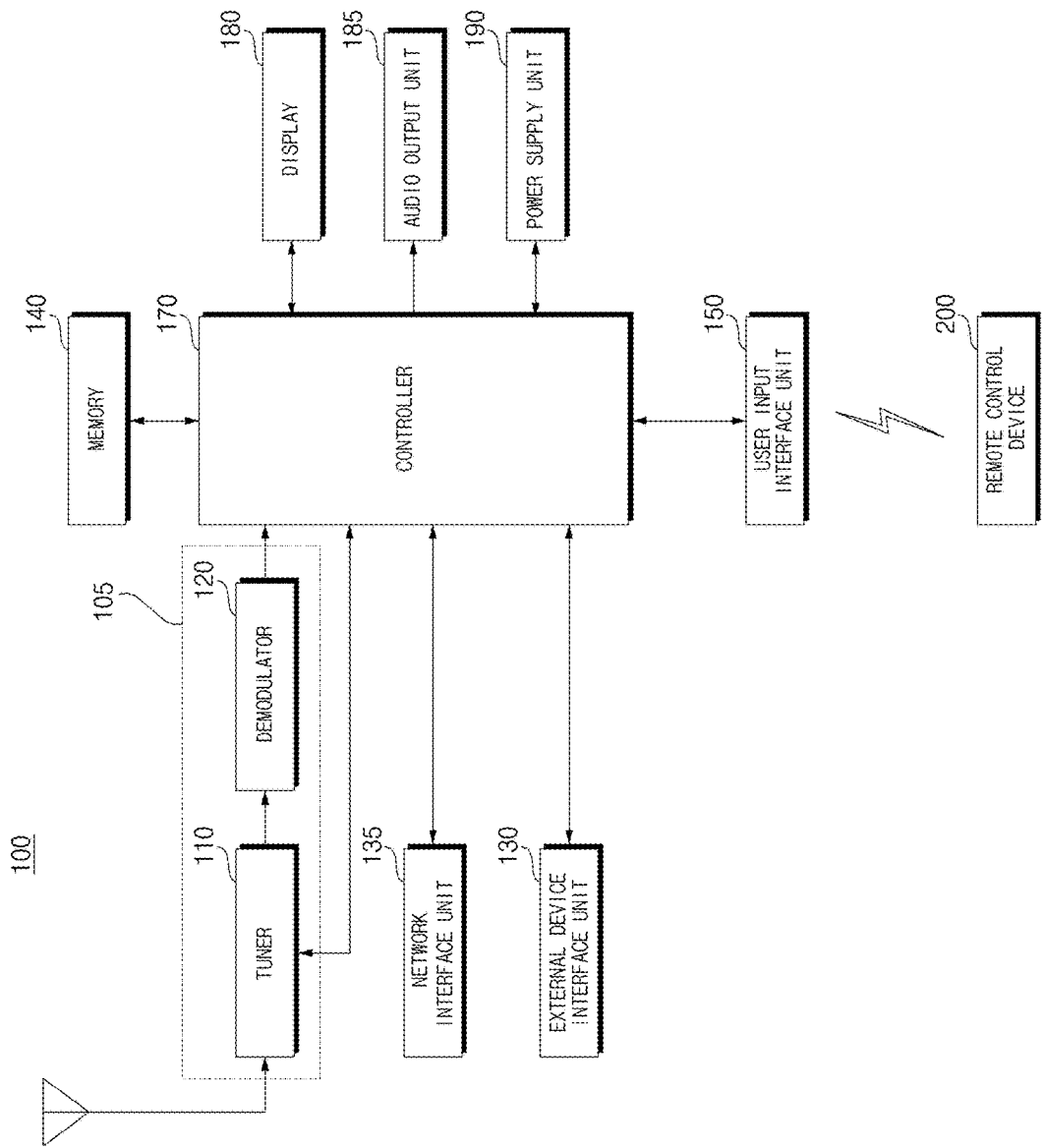
FIG. 2 is an example of an internal block diagram of the image display apparatus illustrated in FIG. 1.

FIG. 2 is an example of an internal block diagram of the image display apparatus illustrated in FIG. 1.

Referring to FIG. 2, the image display apparatus 100 according to an embodiment of the present invention may include the image receiver 105, an external device interface unit 130, a memory 140, a user input interface unit 150, a sensor unit (not illustrated), the controller 170, the display 180, and an audio output unit 185.

The image receiver 105 may include a tuner 110, a demodulator 120, a network interface unit 135, and the external device interface unit 130.

Unlike FIG. 2, the image receiver 105 may include only the tuner 110, the demodulator 120, and the external device interface unit 130. That is, the image receiver 105 may not include the network interface unit 135.

The tuner 110 tunes a radio frequency (RF) broadcasting signal, which corresponds to a channel selected by the user, or all prestored channels among RF broadcasting signals received through an antenna (not illustrated). Then, the tuner 110 converts the tuned RF broadcasting signal into an intermediate frequency (IF) signal or a baseband image or sound signal.

For example, when the tuned RF broadcasting signal is a digital broadcasting signal, the tuner 110 converts the digital broadcasting signal into a digital IF (DIF) signal. When the tuned RF broadcasting signal is an analogue broadcasting signal, the tuner 110 converts the analogue broadcasting signal into an analogue baseband image or sound signal. That is, the tuner 110 may process a digital broadcasting signal or analogue broadcasting signal. The analogue baseband image or sound signal, output from the tuner 110, may be directly input to the controller 170.

In the present invention, the tuner 110 may sequentially tune RF broadcasting signals of all broadcasting channels, which are stored via a channel memory function, among the RF broadcasting signals received through the antenna, and may convert the tuned RF broadcasting signals into IF signals or baseband image or sound signals.

The tuner 110 may include a plurality of tuners, which receive broadcasting signals from a plurality of channels respectively. Alternatively, the tuner 110 may include a single tuner, which receives broadcasting signals from a plurality of channels.

The demodulator 120 receives the DIF signal, converted by the tuner 110, and performs demodulation of the DIF signal.

The demodulator 120 may output a transport stream (TS) signal after performing demodulation and channel decoding. At this time, the TS signal may be a multiplexed signal including an image signal, a sound signal, and/or a data signal.

The TS signal, output from the demodulator 120, may be input to the controller 170. The controller 170 may perform, for example, demultiplexing and image/sound signal processing, and may output an image to the display 180 and output sound to the audio output unit 185.

The external device interface unit 130 may transmit or receive data to or from a connected external device (not illustrated), for example, a set-top box. To this end, the external device interface unit 130 may include an A/V input/output unit (not illustrated).

The external device interface unit 130 may be connected, by a wire or wirelessly, to an external device, such as a digital versatile disc (DVD), Blu-ray disc, game device, camera, camcorder, computer (notebook computer), or set-top box, and may perform input/output operations with the external device.

The A/V input/output unit may receive image and sound signals from the external device. Meanwhile, a wireless communication unit (not illustrated) may perform short-range wireless communication with other electronic appliances.

Through the wireless communication unit (not illustrated), the external device interface unit 130 may exchange data with an adjacent mobile terminal. In particular, the external device interface unit 130 may receive, for example, device information, information about an application to be executed, and application images from the mobile terminal in a mirroring mode.

The network interface unit 135 provides an interface to connect the image display apparatus 100 to a wired/wireless network including the Internet. For example, the network interface unit 135 may receive content or data, provided over the Internet or by a content provider or a network manager, through the network.

The network interface unit 135 may include a wireless communication unit (not illustrated).

The memory 140 may store programs for control and signal processing in the controller 170, and may store processed image, sound or data signals.

In addition, the memory 140 may perform a function for temporarily storing image, sound or data signals input to the external device interface unit 130. In addition, the memory 140 may store information about a predetermined broadcasting channel via a channel memory function, such as a channel map.

While FIG. 2 illustrates the embodiment in which the memory 140 is provided separately from the controller 170, the present invention is not limited thereto. The memory 140 may be included in the controller 170.

The user input interface unit 150 transfers a user input signal to the controller 170, or transfers a signal from the controller 170 to the user.

For example, the user input interface unit 150 may transmit or receive a user input signal, such as power On/Off, channel selection, screen setup, etc., from a remote control device 200, may transmit a user input signal, input from local keys (not illustrated), such as a power key, channel key, volume key, setup key, etc., to the controller 170, may transfer a user input signal, input from the sensor unit (not illustrated), which senses the user's gesture, to the controller 170, or may transmit a signal from the controller 170 to the sensor unit (not illustrated).

The controller 170 may demultiplex a stream, input through the tuner 110, the demodulator 120, the network interface unit 135, or the external device interface unit 130, or may generate and output a signal for image or sound output by processing multiplexed signals.

An image signal processed in the controller 170 may be input to the display 180 so as to be displayed in the form of an image corresponding to the image signal. In addition, the image signal processed in the controller 170 may be input to an external output device through the external device interface unit 130.

A sound signal processed in the controller 170 may be input to the audio output unit 185 so as to be output in the form of sound. In addition, the sound signal processed in the controller 170 may be input to an external output device through the external device interface unit 130.

Although not illustrated in FIG. 2, the controller 170 may include, for example, a demultiplexer and an image processor. This will be described later with reference to FIG. 3.

In addition, the controller 170 may control the overall operation of the image display apparatus 100. For example, the controller 170 may control the tuner 110 so as to tune an RF broadcasting corresponding to a channel selected by the user or a prestored channel.

In addition, the controller 170 may control the image display apparatus 100 based on a user command input through the user input interface unit 150 or internal programs.

The controller 170 may control the display 180 so as to display an image. At this time, the image displayed on the display 180 may be a still image or moving image, and may be a 2-dimensional (2D) or 3D image.

The controller 170 may allow a predetermined 2D object to be displayed in the image displayed on the display 180. For example, the object may be at least one of an accessed web page (e.g. a newspaper or magazine), an electronic program guide (EPG), various menus, widgets, icons, still images, moving images, and text.

The controller 170 may recognize the user's position based on an image captured by a capturing unit (not illustrated). For example, the controller 170 may recognize the distance (z-axis coordinate) between the user and the image display apparatus 100. Moreover, the controller 170 may recognize the x-axis coordinate and the y-axis coordinate in the display 180 that correspond to the user's position.

The display 180 converts an image signal, data signal, OSD signal, or control signal processed by the controller 170, or an image signal, data signal, or control signal received from the external device interface unit 130 so as to generate a drive signal.

The display 180 may be, for example, a PDP, LCD, OLED, or flexible display, and may also function as a 3D display. The 3D display 180 may be divided into a glass type and a glass-free type.

The display 180 may be configured as a touchscreen so as to be used as an input device as well as an output device.

The audio output unit 185 receives a processed sound signal from the controller 170 and outputs sound.

The capturing unit (not illustrated) captures an image of the user. While the capturing unit (not illustrate) may be implemented as a single camera, the present invention is not limited thereto and the capturing unit may be implemented as a plurality of cameras. The capturing unit (not illustrated) may be embedded in the image display apparatus 100 at a position above the display 180, or may be separately provided. Image information captured by the capturing unit (not illustrated) may be input to the controller 170.

The controller 170 may sense the user's gesture based on the image captured by the capturing unit (not illustrated), a sensed signal from the sensor unit (not illustrated), or a combination thereof.

A power supply unit 190 supplies a voltage to the entire image display apparatus 100. In particular, the power supply unit 190 may supply a voltage to, for example, the controller 170, which may be implemented in a system-on-chip (SOC) form, the display 180 for image display, and the audio output unit 185 for sound output.

Specifically, the power supply unit 190 may include a converter for converting an AC voltage into a DC voltage, and a DC/DC transformer for converting the level of DC voltage.

The remote control device 200 transmits user input to the user input interface unit 150. To this end, the remote control device 200 may perform communication by Bluetooth, RF communication, infrared (IR) communication, Ultra Wideband (UWB), ZigBee, etc. In addition, the remote control device 200 may receive an image, sound or data signal output from the user input interface unit 150 so as to display an image or to output sound.

The image display apparatus 100 described above may be a fixed or movable digital broadcasting receiver that may receive digital broadcasts.

The block diagram of the image display apparatus 100 illustrated in FIG. 2 illustrates one embodiment of the present invention. Respective components of the block diagram may be merged, added, or removed depending on the specification of the image display apparatus 100 that is actually implemented. That is, as needed, two or more components may be merged into a single component, or a single component may be divided into two or more components. In addition, the function performed in each block is merely intended to describe the embodiment of the present invention, and a specific operation or a specific device related to the function does not limit the scope of the present invention.

Figure 3:
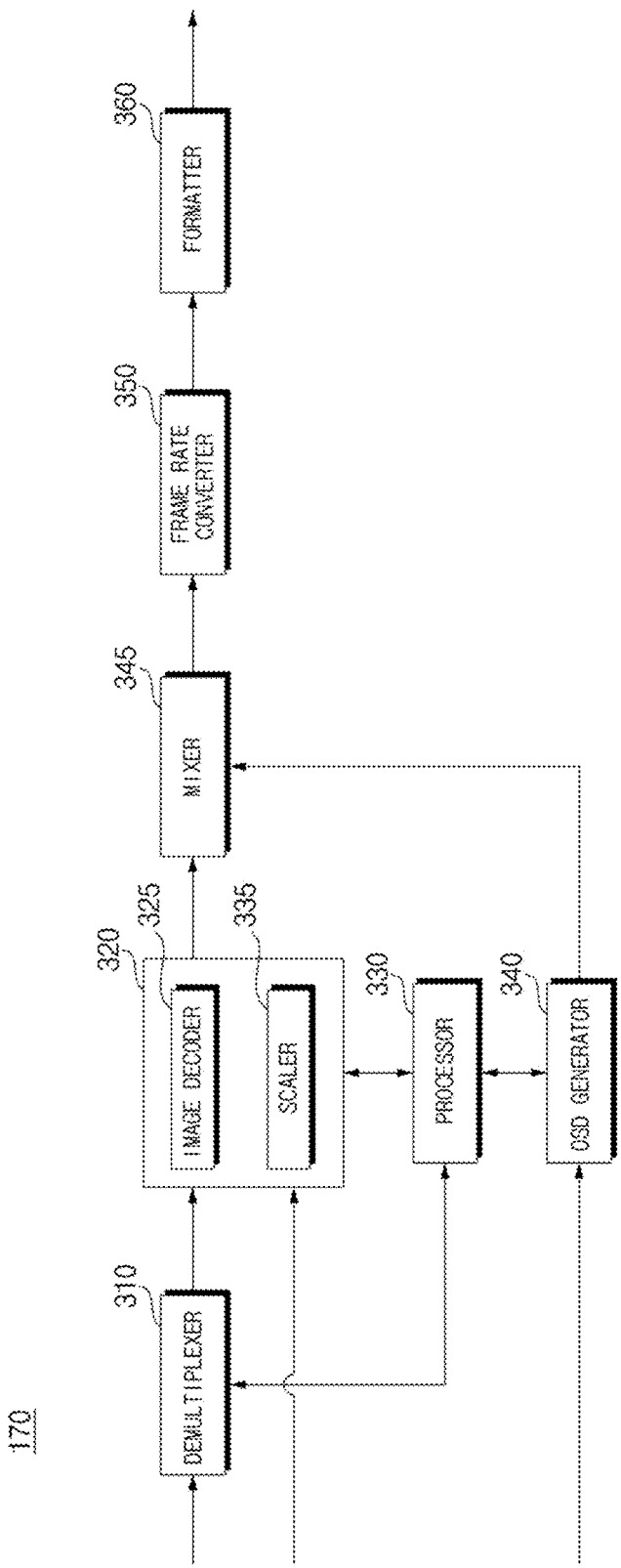
FIG. 3 is an example of an internal block diagram of a controller illustrated in FIG. 2.

FIG. 3 is an example of an internal block diagram of the controller illustrated in FIG. 2.

Explaining with reference to FIG. 3, the controller 170 according to the embodiment of the present invention may include a demultiplexer 310, an image processor 320, a processor 330, an OSD generator 340, a mixer 345, a frame rate converter 350, and a formatter 360. In addition, the controller 170 may further include an audio processor (not illustrated) and a data processor (not illustrated).

The demultiplexer 310 demultiplexes an input stream. For example, when an MPEG-2 TS is input, the demultiplexer 310 demultiplexes the input stream so as to separate it into an image, sound and data signals. Here, the stream signal input to the demultiplexer 310 may be a stream signal output from the tuner 110, the demodulator 120, or the external device interface unit 130.

The image processor 320 may perform image processing for a demultiplexed image signal. To this end, the image processor 320 may be provided with an image decoder 325 and a scaler 335.

The image decoder 325 decodes the demultiplexed image signal, and the scaler 335 performs scaling of resolution for the decoded image signal so that an image may be output from the display 180.

The image decoder 325 may include decoders compliant with various standards. For example, the image decoder 325 may include an MPEG-2 or H.264 decoder, a 3D image decoder for a color image and a depth image, or a decoder for a multiple viewpoint image.

The processor 330 may control the overall operation of the image display apparatus 100 or in the controller 170. For example, the processor 330 may control the tuner 110 so as to tune an RF broadcasting corresponding to a channel selected by the user or a prestored channel.

In addition, the processor 330 may control the image display apparatus 100 by a user command input via the user input interface unit 150, or internal programs.

In addition, the processor 330 may perform control for data transmission to or from the network interface unit 135 or the external device interface unit 130.

In addition, the processor 330 may control operations of, for example, the demultiplexer 310, the image processor 320, and the OSD generator 340 in the controller 170.

The OSD generator 340 generates an OSD signal by itself or in response to user input. For example, the OSD generator 340 may generate a signal to display various pieces of information on the screen of the display 180 in the form of graphics or text based on a user input signal. The generated OSD signal may include various types of data, such as a user interface screen of the image display apparatus, a screen displaying various menus, widgets, and icons. In addition, the generated OSD signal may include a 2D object or 3D object.

In addition, the OSD generator 340 may generate a pointer, which may be displayed on the display 180, based on a pointing signal input from the remote control device 200. In particular, the pointer may be generated in a pointing signal processor, and the OSD generator 340 may include the pointing signal processor (not illustrated). Of course, the pointing signal processor (not illustrated) may be provided separately, rather than being provided in the OSD generator 340.

The mixer 345 may mix the OSD signal generated in the OSD generator 340 and the demodulated image signal processed in the image processor 320 with each other. The mixed image signal is provided to the frame rate converter 350.

The frame rate converter (FRC) 350 may convert the frame rate of an input image. The frame rate converter 350 may output the input image without separate frame rate conversion.

The formatter 360 may arrange a left-eye image frame and a right-eye image frame of a 3D image, the frame rate of which has been converted. Then, the formatter 360 may output a synchronous signal Vsync for the opening of a left-eye glass and a right-eye glass of a 3D viewing device (not illustrated).

The formatter 360 may change the format of an input image signal into an image signal, and may output the image signal so as to be displayed on the display 180.

In addition, the formatter 360 may change the format of a 3D image signal. For example, the formatter 360 may change the format of a 3D image signal into one of various formats including a side-by-side format, a top/down format, a frame sequential format, an interlaced format, and a checker box format.

The formatter 360 may convert a 2D image signal into a 3D image signal. For example, based on a 3D image generation algorithm, the formatter 360 may detect an edge or a selectable object in the 2D image signal, and separates an object depending on the detected edge or the selectable object into a 3D image signal. At this time, the generated 3D image signal, as described above, may be divided into a left-eye image signal L and a right-eye image signal R, which will be subsequently arranged.

Although not illustrated in FIG. 3, a 3D processor (not illustrated) for 3D effect signal processing may be additionally provided after the formatter 360. The 3D processor (not illustrated) may adjust, for example, the brightness, tint, and color of an image signal to improve 3D effects. For example, the 3D processor may perform signal processing to cause an image to be clear at a short distance and to be blurred at a remote distance. This function of the 3D processor may be integrated in the formatter 360, or may be integrated in the image processor 320.

Meanwhile, the audio processor (not illustrated) in the controller 170 may perform sound processing of a demultiplexed sound signal. To this end, the audio processor (not illustrated) may include various decoders.

In addition, the audio processor (not illustrated) in the controller 170 may process, for example, base, treble, or volume adjustment.

The data processor (not illustrated) in the controller 170 may perform data processing of a demultiplexed data signal. For example, when the demultiplexed data signal is an encoded data signal, the data processor may decode the data signal. The encoded data signal may be electronic program guide (EPG) information, which includes broadcasting information regarding a time table of broadcasting programs broadcast at each channel.

The block diagram of the controller 170 illustrated in FIG. 3 is a block diagram for one embodiment of the present invention. Respective components of the block diagram may be merged, added, or removed depending on the specifications of the controller 170 to be actually implemented.

In particular, the frame rate converter 350 and the formatter 360 may be separately provided, rather than being provided in the controller 170, or may constitute a single module.

Figure 4A:
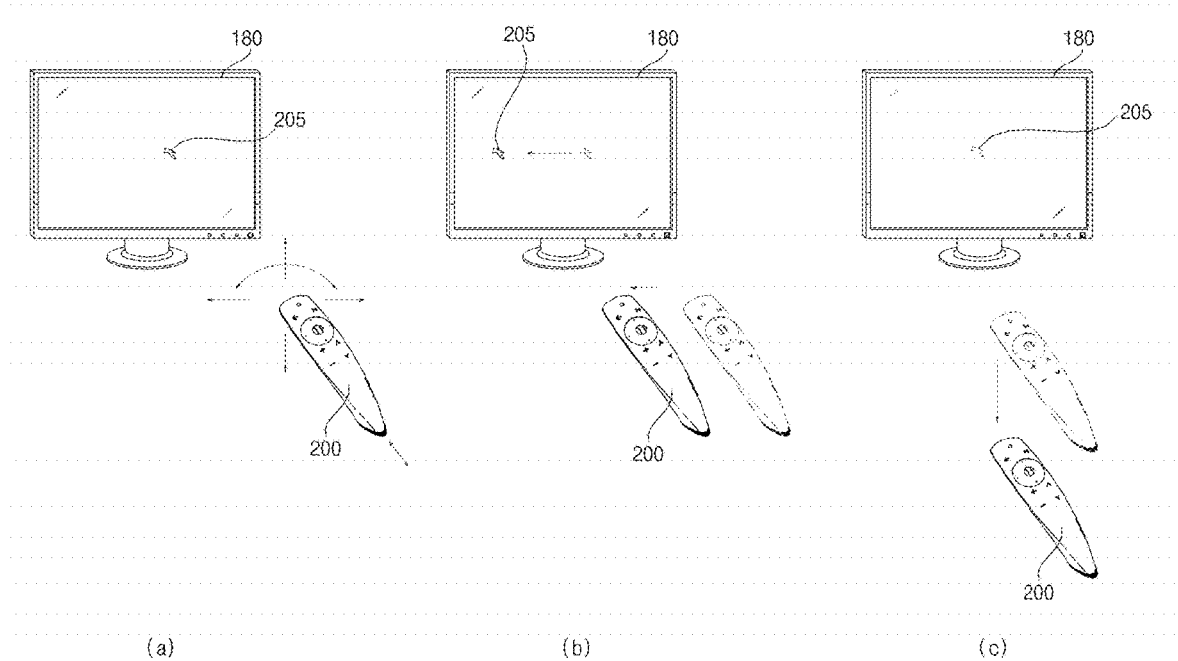
FIG. 4A is a view illustrating a control method of a remote control device illustrated in FIG. 2.

FIG. 4A is a view illustrating a control method of the remote control device illustrated in FIG. 2.

As illustrated in (a) of FIG. 4A, a pointer 205 corresponding to the remote control device 200 is displayed on the display 180.

The user may move or rotate the remote control device 200 upward or downward, leftward or rightward (see (b) of FIG. 4A), and forward or rearward (see (c) of FIG. 4A). The pointer 205 displayed on the display 180 corresponds to the movement of the remote control device 200. The remote control device 200 may be referred to as a spatial remote controller or a 3D pointing device because the pointer 205 corresponding thereto is moved and displayed so as to match the movement of the remote control device 200 in a 3D space as illustrated in FIG. 4A.

As illustrated in (b) of FIG. 4A, when the user moves the remote control device 200 leftward, the pointer 205, displayed on the display 180 of the image display apparatus, is correspondingly moved leftward.

Information about the movement of the remote control device 200, sensed by a sensor of the remote control device 200, is transmitted to the image display apparatus. The image display apparatus may calculate the coordinates of the pointer 205 from the information about the movement of the remote control device 200. The image display apparatus may display the pointer 205 so as to match the calculated coordinates.

As illustrated in (c) of FIG. 4A, the user may move the remote control device 200 away from the display 180 while pushing a specific button on the remote control device 200. Thereby, a selected area in the display 180, which corresponds to the pointer 205, may be zoomed in so as to be displayed at an enlarged scale. On the contrary, when the user moves the remote control device 200 to the display 180 while pushing a specific button on the remote control device 200, a selected area in the display 180, which corresponds to the pointer 205, may be zoomed out so as to be displayed at a reduced scale. That is, a selected area may be zoomed out when the remote control device 200 is moved away from the display 180, and may be zoomed in when the remote control device 200 is moved closer to the display 180.

In the state in which a specific button on the remote control device 200 is pushed, upward/downward and leftward/rightward movements may not be recognized. That is, when the remote control device 200 is moved away from or to the display 180, only forward/rearward movement may be recognized without the recognition of upward/downward and leftward/rightward movements. In the state in which no specific button on the remote control device 200 is pushed, the pointer 205 is moved depending on the upward/downward and leftward/rightward movements of the remote control device 200.

The speed or direction of movement of the pointer 205 may match the speed or direction of movement of the remote control device 200.

Figure 4B:
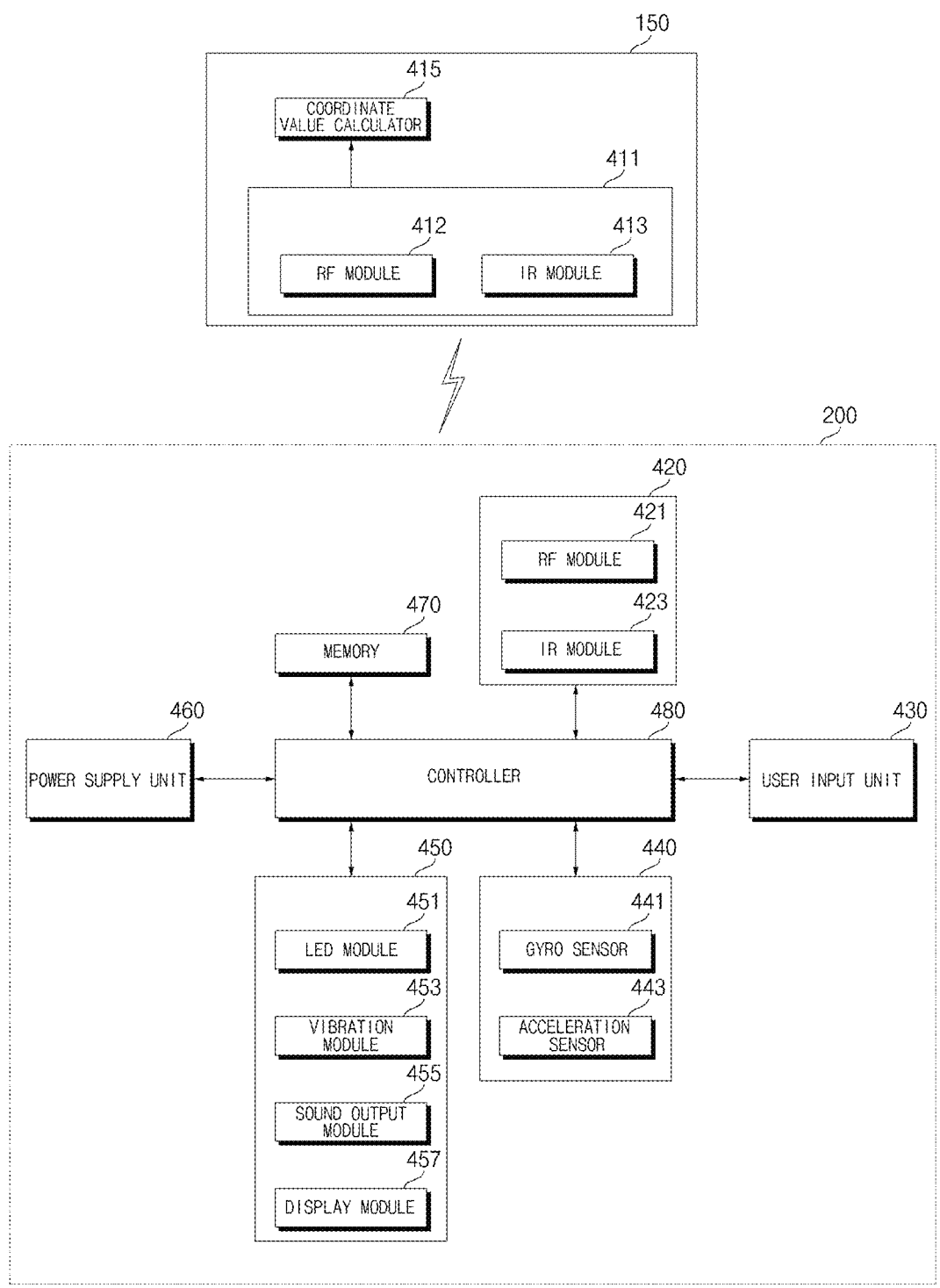
FIG. 4B is an internal block diagram of the remote control device illustrated in FIG. 2.

FIG. 4B is an internal block diagram of the remote control device illustrated in FIG. 2.

Explaining with reference to FIG. 4B, the remote control device 200 may include a wireless communication unit 420, a user input unit 430, a sensor unit 440, an output unit 450, a power supply unit 260, a memory 470, and a controller 480.

The wireless communication unit 420 transmits and receives signals to and from any one of the image display apparatuses according to the embodiments of the present invention described above. Among the image display apparatuses according to the embodiments of the present invention, the single image display apparatus 100 will be described below by way of example.

In the present embodiment, the remote control device 200 may include an RF module 421, which may transmit and receive signals to and from the image display apparatus 100 based on an RF communication standard. In addition, the remote control device 200 may include an IR module 423, which may transmit and receive signals to and from the image display apparatus 100 based on an IR communication standard.

In the present embodiment, the remote control device 200 transmits a signal, which includes information regarding, for example, the movement of the remote control device 200, to the image display apparatus 100 via the RF module 421.

In addition, the remote control device 200 may receive a signal transmitted from the image display apparatus 100 via the RF module 421. The remote control device 200 may transmit a command for power on/off, channel change, volume change, etc. to the image display apparatus 100 via the IR module 423.

The user input unit 430 may include a keypad, buttons, a touch pad, a touchscreen, etc. The user may input a command related to the image display apparatus 100 to the remote control device 200 by operating the user input unit 430. When the user input unit 430 includes hard key buttons, the user may input a command related to the image display apparatus 100 to the remote control device 200 by pushing the hard key buttons. When the user input unit 430 includes a touchscreen, the user may input a command related to the image display apparatus 100 to the remote control device 200 by touching soft keys on the touchscreen. In addition, the user input unit 435 may include various other input means that the user can operate, such as, for example, a scroll key or a jog wheel, and the present embodiment does not limit the scope of the present invention.

The sensor unit 440 may include a gyro sensor 441 or an acceleration sensor 443. The gyro sensor 441 may sense information regarding the movement of the remote control device 200.

In one example, the gyro sensor 441 may sense information about the movement of the remote control device 200 along the x-, y- and z-axes. The acceleration sensor 443 may sense information about the speed of movement of the remote control device 200. The sensor unit 440 may further include a distance measurement sensor, and may sense the distance to the display 180.

The output unit 450 may output an image or sound signal, which corresponds to the operation of the user input unit 430 or a signal transmitted from the image display apparatus 100. The user may recognize whether the user input unit 435 is operated or not, or whether the image display apparatus 100 is controlled or not via the output unit 450.

In one example, the output unit 450 may include an LED module 451, which is illuminated when transmitting or receiving a signal to or from the image display apparatus 100 via the wireless communication unit 425 or when the user input unit 435 is operated, a vibration module 453 for generating vibrations, a sound output module 455 for outputting sound, or a display module 457 for outputting an image.

The power supply unit 460 supplies power to the remote control device 200. The power supply unit 460 may reduce power consumption by stopping the supply of power when the remote control device 200 is not moved during a predetermined time. The power supply unit 460 may resume the supply of power when a predetermined key provided on the remote control device 200 is operated.

The memory 470 may store various kinds of programs, application data, etc., which are required to control or operate the remote control device 200. When the remote control device 200 wirelessly transmits or receives signals to or from the image display apparatus 100 via the RF module 421, the remote control device 200 and the image display apparatus 100 transmit or receive signals using a predetermined frequency band. The controller 480 of the remote control device 200 may store, in the memory 470, for example, information about the frequency band in which the remote control device 200 is capable of wirelessly transmitting or receiving signals to or from the image display apparatus 100 that is paired with the remote control device 200, and may refer to the stored information.

The controller 480 controls various matters related to the control of the remote control device 200. The controller 480 may transmit a signal, which corresponds to the operation of a predetermined key in the user input unit 430, or a signal, which corresponds to the movement of the remote control device 200 sensed by the sensor unit 440, to the image display apparatus 100 via the wireless communication unit 420.

The user input interface unit 150 of the image display apparatus 100 may include a wireless communication unit 411, which may wirelessly transmit or receive signals to or from the remote control device 200, and a coordinate value calculator 415, which may calculate coordinate values of the pointer corresponding to the movement of the remote control device 200.

The user input interface unit 150 may wirelessly transmit or receive signals to or from the remote control device 200 via an RF module 412. In addition, the user input interface unit 150 may receive signals transmitted from the remote control device 200 based on an IR communication standard via an IF module 413.

The coordinate value calculator 415 may calculate coordinate values (x,y) of the pointer 205 to be displayed on the display 180 from a signal, which corresponds to the movement of the remote control device 200, received via the wireless communication unit 411 via hand-shaking correction or error correction.

The transmission signal of the remote control device 200, input to the image display apparatus 100 via the user input interface unit 150, is transmitted to the controller 170 of the image display apparatus 100. The controller 170 may determine information about the movement and key operation of the remote control device 200 from the signal transmitted from the remote control device 200, and may control the image display apparatus 100 based on the determined information.

In another example, the remote control device 200 may calculate the coordinate values of the pointer corresponding to the movement thereof, and may output the same to the user input interface unit 150 of the image display apparatus 100. In this case, the user input interface unit 150 of the image display apparatus 100 may transmit information about the received coordinate values of the pointer to the controller 170 without additional hand-shaking correction or error correction.

In a further example, the coordinate value calculator 415 may be provided in the controller 170, rather than being provided in the user input interface unit 150, unlike FIG. 4B.

FIGS. 5A to 5D are flowcharts illustrating one example of a method of operating the image display apparatus according to various embodiments of the present invention.

Figure 5A:
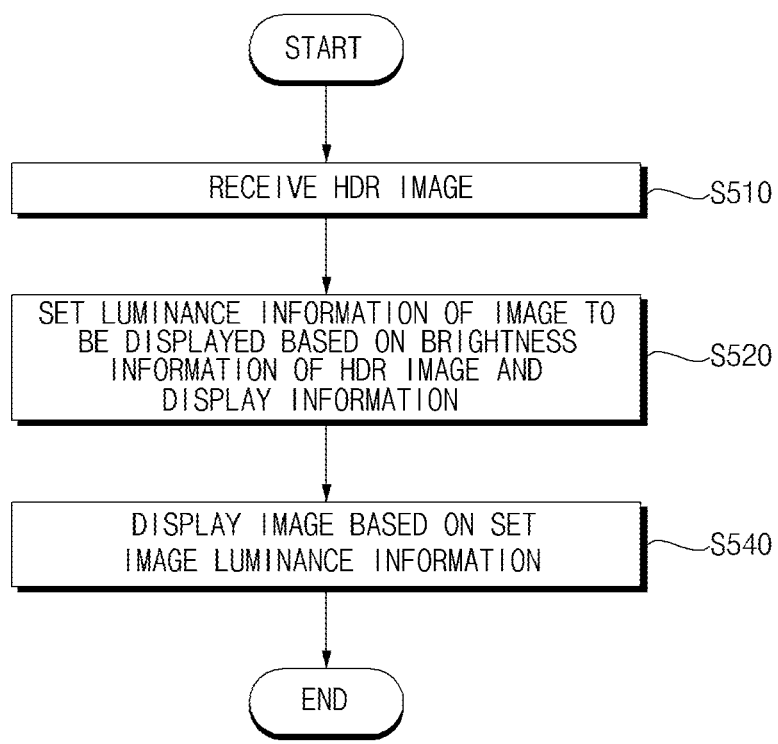
FIGS. 5A to 5D are flowcharts illustrating an example of a method of operating an image display apparatus according to various embodiments of the present invention.

First, FIG. 5A is a flowchart illustrating one example of a method of operating the image display apparatus according to an embodiment of the present invention.

Referring to FIG. 5A, the image receiver 105 in the image display apparatus 100 may receive a high dynamic range (HDR) image (S510).

Here, the HDR image may mean an image having a luminance of 1,000 nit or more. A standard dynamic range (SDR) image may mean an image having a luminance up to 100 nit.

In the present invention, the HDR image may mean an image that is larger than the displayable dynamic range of the display panel 180. That is, when the maximum luminance of an input image is greater than the maximum luminance that is displayable on the display panel 180, the input image may be referred to as an HDR image.

Subsequently, the controller 170 in the image display apparatus 100 may set luminance information of an image to be displayed based on the brightness information of the HDR image and display information (S520).

Subsequently, the controller 170 in the image display apparatus 100 may perform control to display an image, the luminance of which is adjusted based on the set image luminance information (S540).

Specifically, the controller 170 in the image display apparatus 100 may set the luminance information of the image to be displayed based on the brightness information depending on the distribution of brightness in the HDR image and information about luminance that is displayable on the display 180 among the display information.

For example, the controller 170 in the image display apparatus 100 may extract maximum luminance information based on the brightness information of the HDR image, and may perform control to reduce a saturation section upon luminance setting as the maximum luminance is increased, for the expression of a wide range of luminance. Accordingly, an image that matches the intention of the creator of the HDR image may be displayed.

In particular, the controller 170 in the image display apparatus 100 may extract maximum luminance information based on the brightness information of the HDR image, and may perform control to reduce a saturation section upon luminance setting when the maximum luminance is greater than the displayable saturation luminance of the display 180. Accordingly, an image that matches the intention of the creator of the HDR image may be displayed.

Meanwhile, the controller 170 may set luminance information of an image to be displayed on a per-image-scene or per-image-frame basis based on the brightness information of the HDR image on a per-image-scene or per-image-frame basis and information about luminance that is displayable on the display 180, and may perform control to display an image, the luminance of which is adjusted on a per-image-scene or per-image-frame basis based on the set image luminance information. Accordingly, an image, the luminance of which is adjusted on a per-image-scene or per-image-frame basis, and which matches the intention of the creator of the HDR image, may be displayed.

Figure 5B:
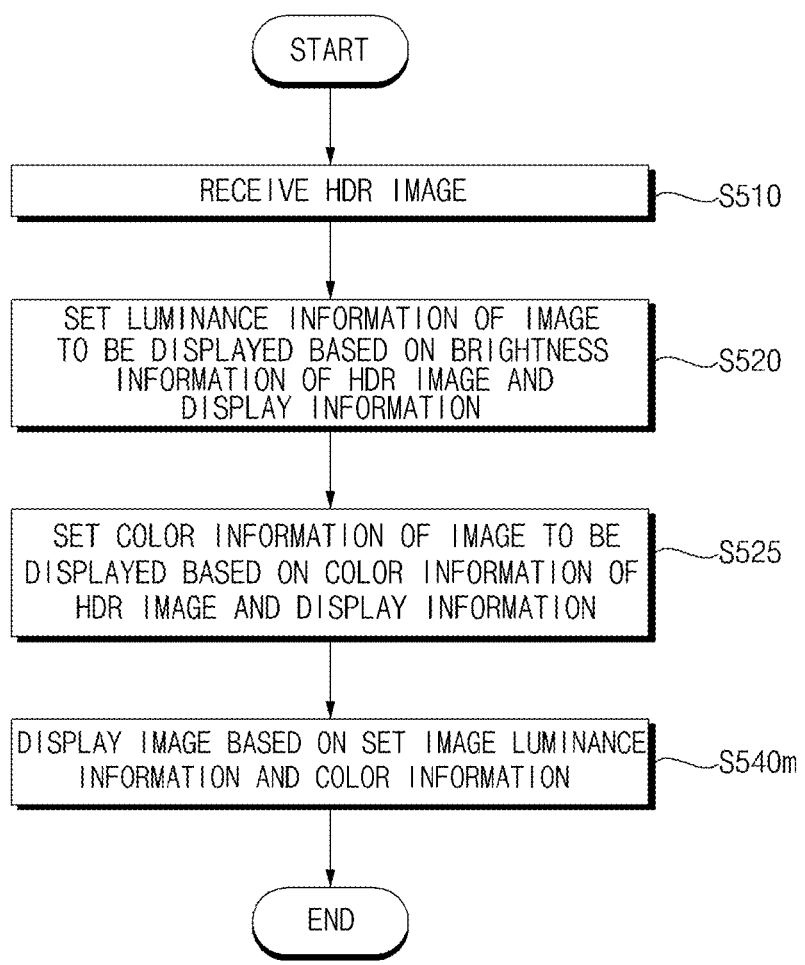

Next, FIG. 5B is a flowchart illustrating one example of a method of operating the image display apparatus according to another embodiment of the present invention.

The operating method of the image display apparatus of FIG. 5B is similar to the operating method of the image display apparatus of FIG. 5A, but has a difference in terms of the addition of Step 525 (S525). The following description is focused on the difference.

The controller 170 in the image display apparatus 100 may perform control to perform Step 525 (S525) and Step 540 (S540*m*) after Step 520 (S520).

The controller 170 in the image display apparatus 100 may set color information of an image to be displayed based on color information of the HDR image and information about colors that are displayable on the display 180 (S525).

Subsequently, the controller 170 in the image display apparatus 100 may perform control to display an image, the color of which is adjusted based on the set image color information, and the luminance of which is adjusted based on the set image luminance information (S540*m*).

Here, each of the color information of the HDR image and the information about colors that are displayable on the display 180 may mean color gamut information.

Specifically, the controller 170 in the image display apparatus 100 may set color information of an image to be displayed based on color information of the HDR image depending on color distribution and information about colors that are displayable on the display 180 among display information.

For example, the controller 170 in the image display apparatus 100 may extract maximum color information based on the color information of the HDR image, and may perform control to reduce a saturation section upon color setting as the maximum color range is increased, for the expression of a wide range of colors. Accordingly, an image that matches the intention of the creator of the HDR image may be displayed.

In particular, the controller 170 in the image display apparatus 100 may extract maximum color information based on the color information of the HDR image, and may perform control to reduce a saturation section upon color setting when the maximum color range is greater than the displayable saturation color range of the display 180. Accordingly, an image that matches the intention of the creator of the HDR image may be displayed.

Meanwhile, the controller 170 may set color information of an image to be displayed on a per-image-scene or per-image-frame basis based on color information of the HDR image on a per-image-scene or per-image-frame basis and the information about colors that are displayable on the display 180, and may perform control to display an image, the color of which is adjusted on a per-image-scene or per-image-frame basis based on the set image color information. Accordingly, an image, the color of which is adjusted on a per-image-scene or per-image-frame basis, and which matches the intention of the creator of the HDR image, may be displayed.

Figure 5C:
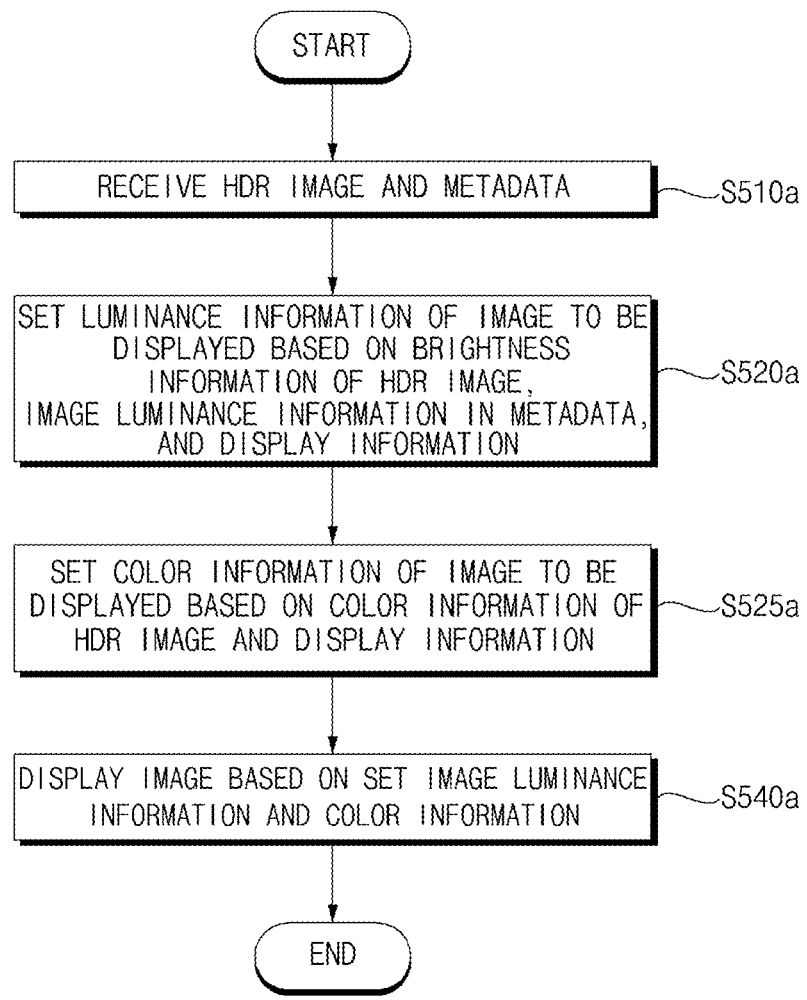

Next, FIG. 5C is a flowchart illustrating one example of a method of operating the image display apparatus according to another embodiment of the present invention.

The operating method of the image display apparatus of FIG. 5C is similar to the operating method of the image display apparatus of FIG. 5B. The following description is focused on the differences therebetween.

The image receiver 105 in the image display apparatus 100 may receive an HDR image and metadata (S510*a*).

Specifically, the image receiver 105 in the image display apparatus 100 may receive an input image stream, and may separate an HDR image and metadata from the input image stream.

Subsequently, the controller 170 in the image display apparatus 100 may set luminance information of an image to be displayed based on brightness information of the HDR image, image luminance information in the metadata, and display information, and more particularly, information about luminance that is displayable on the display 180 (S520*a*).

Subsequently, the controller 170 in the image display apparatus 100 may set color information of the image to be displayed based on color information of the HDR image and display information, and more particularly, information about colors that are displayable on the display 180 (S525*a*).

Subsequently, the controller 170 in the image display apparatus 100 may perform control to display the image, the color of which is adjusted based on the set image color information, and the luminance of which is adjusted based on the set image luminance information (S540*a*).

The image luminance information in the metadata may include, for example, minimum image luminance information and maximum image luminance information.

Meanwhile, the controller 170 may set luminance information of an image to be displayed on a per-image-scene or per-image-frame basis based on brightness information of the HDR image on a per-image-scene or per-image-frame basis, image luminance information in the metadata, and information about luminance that is displayable on the display 180, and may perform control to display an image, the luminance of which is adjusted on a per-image-scene or per-image-frame basis based on the set image luminance information. Accordingly, an image, the luminance of which is adjusted on a per-image-scene or per-image-frame basis, and which matches the intention of the creator of the HDR image, may be displayed.

Figure 5D:
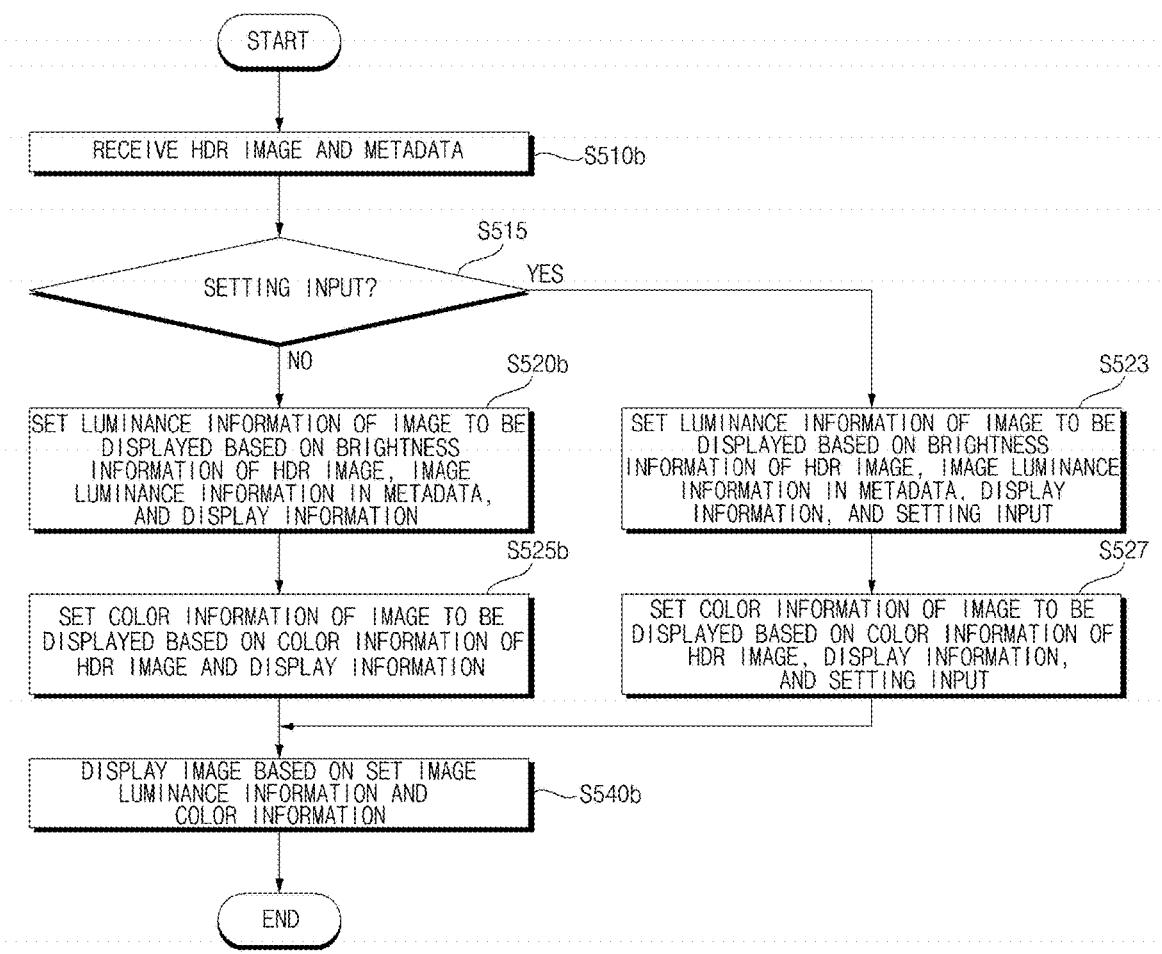

Next, FIG. 5D is a flowchart illustrating one example of a method of operating the image display apparatus according to another embodiment of the present invention.

The operating method of the image display apparatus of FIG. 5D is similar to the operating method of the image display apparatus of FIG. 5C, but has a difference in terms of the addition of setting input. The following description is focused on the difference.

The image receiver 105 in the image display apparatus 100 may receive an HDR image and metadata (S510*b*).

Subsequently, the controller 170 in the image display apparatus 100 may receive user setting input via the user input interface unit 150 (S520*b*).

When any one of a luminance setting object, a color setting object and a contrast setting object in the setting screen displayed on the display 180 is selected using the remote control device 200, the controller 170 in the image display apparatus 100 may receive selected setting input.

For example, when luminance setting input is made via the luminance setting object, Step 523 (S523) and Step 527 (S527) may be performed.

That is, the controller 170 in the image display apparatus 100 may set luminance information of an image to be displayed based on brightness information of the HDR image, image luminance information in the metadata, and display information, and more particularly, information about luminance that is displayable on the display 180, and luminance setting input (S523).

Subsequently, the controller 170 in the image display apparatus 100 may set color information of the image to be displayed based on color information of the HDR image and display information, and more particularly, information about colors that are displayable on the display 180 (S525b).

Subsequently, the controller 170 in the image display apparatus 100 may perform control to display the image, the color of which is adjusted based on the set image color information, and the luminance of which is adjusted based on the set image luminance information (S540b).

On the other hand, when no luminance setting input is made via the luminance setting object, Step 520 (S520b) and Step 525 (S525b) may be performed.

That is, the controller 170 in the image display apparatus 100 may set luminance information of an image to be displayed based on brightness information of the HDR image, image luminance information in the metadata, and display information, and more particularly, information about luminance that is displayable on the display 180 (S520b).

Subsequently, the controller 170 in the image display apparatus 100 may set color information of the image to be displayed based on color information of the HDR image and display information, and more particularly, information about colors that are displayable on the display 180 (S525b).

Subsequently, the controller 170 in the image display apparatus 100 may perform control to display an image, the color of which is adjusted based on the set image color information, and the luminance of which is adjusted based on the set image luminance information (S540b).

Although not illustrated in FIG. 5D, when color setting input is made via the color setting object, the controller 170 in the image display apparatus 100 may set color information of an image to be displayed based on color information of the HDR image, image color information in the metadata, and display information, and more particularly, information about colors that are displayable on the display 180.

Subsequently, the controller 170 in the image display apparatus 100 may perform control to display an image, the color of which is adjusted based on the set image color information.

Although not illustrated in FIG. 5D, when contrast setting input is made via the contrast setting object, the controller 170 in the image display apparatus 100 may set contrast information of an image to be displayed based on contrast information of the HDR image, image contrast information in the metadata, and display information, and more particularly, information about contrast that is displayable on the display 180.

Subsequently, the controller 170 in the image display apparatus 100 may perform control to display an image, the contrast of which is adjusted based on the set image contrast information.

FIGS. 6A to 16B are views referenced to explain the operating method of FIGS. 5A to 5D.

Figure 6A:
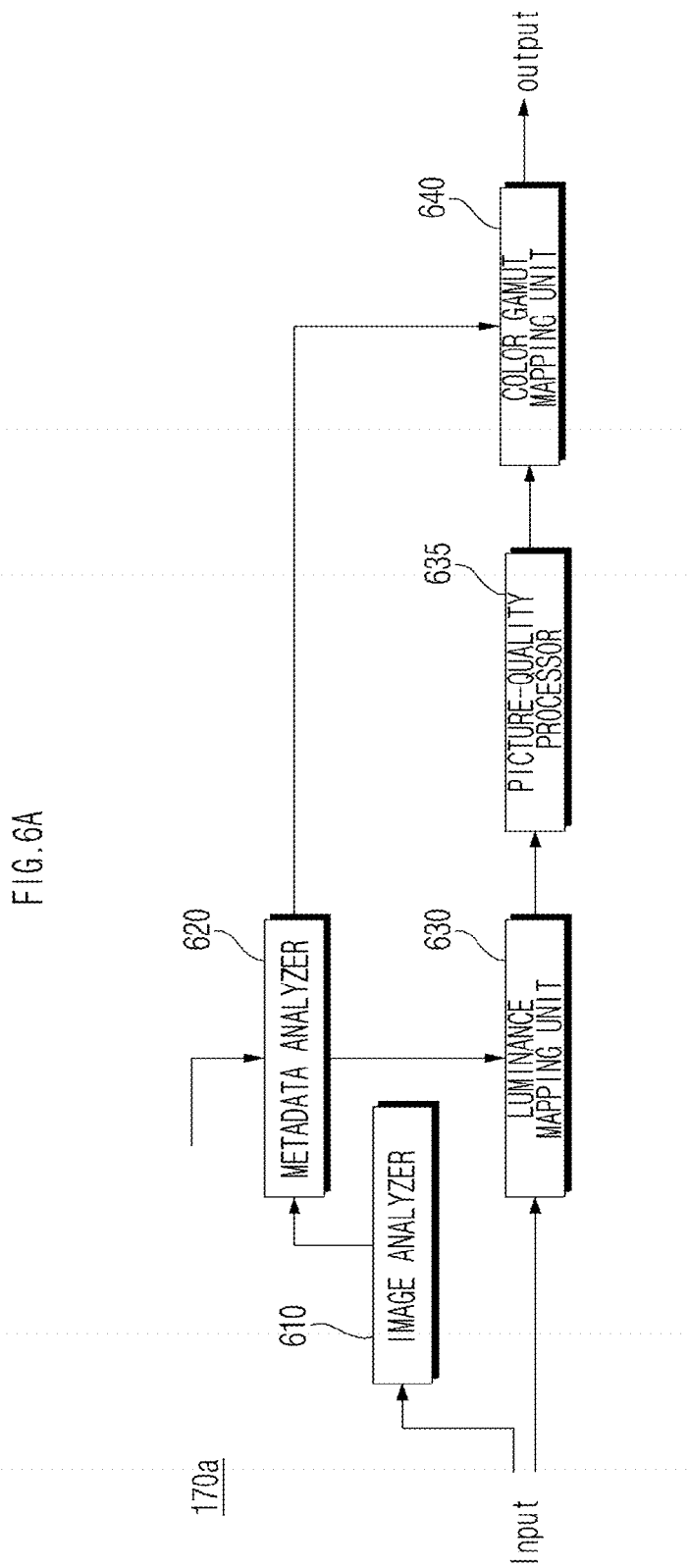

First, FIG. 6A illustrates one example of an internal block diagram of the controller of FIG. 2.

Referring to FIG. 6A, the controller 170a of FIG. 6A may include an image analyzer 610, a metadata analyzer 620, a luminance mapping unit 630, a picture-quality processor 635, and a color gamut mapping unit 640.

The image analyzer 610 may receive an HDR image from the image receiver 105, and may extract brightness information of the HDR image.

That is, the image analyzer 610 may analyze brightness of the HDR image transmitted from the image receiver 105, and may transmit the result of analysis of the brightness of the HDR image to the metadata analyzer 620.

Specifically, the image analyzer 610 may generate a brightness histogram of the HDR image, and may transmit the distribution of brightness of the HDR image to the metadata analyzer 620.

The metadata analyzer 620 may set a first lookup table for setting the luminance of an image to be displayed based on brightness information of the HDR image, HDR image luminance information in the metadata, and information about luminance that is displayable on the display 180.

The metadata analyzer 620 may extract maximum luminance information from the brightness information of the HDR image, and may perform control to vary a saturation section upon luminance setting based on the maximum luminance information.

The meta data analyzer 620 may set luminance information of an image to be displayed on a per-image-scene or per-image-frame basis based on brightness information of the HDR image on a per-image-scene or per-image-frame basis and information about luminance that is displayable on the display 180.

The metadata analyzer 620 may set a second lookup table for setting the color of an image to be displayed based on HDR image color information in the metadata and information about colors that are displayable on the display 180.

The metadata analyzer 620 may set the first lookup table for setting the luminance of an image to be displayed based on luminance setting input, brightness information of the HDR image, HDR image luminance information in the metadata, and information about luminance that is displayable on the display 180.

In particular, the metadata analyzer 620 may extract maximum luminance information and set luminance information depending on luminance setting input from the brightness information of the HDR image, and may perform control to vary a saturation section upon luminance setting based on the maximum luminance information and the set luminance information.

The metadata analyzer 620 may perform control to reduce the saturation section upon luminance setting as the maximum luminance level is increased.

The metadata analyzer 620 may perform control to reduce the saturation section upon luminance setting as the set luminance level is increased.

The metadata analyzer 620 may receive metadata and display information.

The metadata may include, for example, minimum image luminance information, maximum image luminance information, image color information, and mastering display information.

The display information may include, for example, information about the upper limit and lower limit of brightness that is displayable on the display 180, and color gamut information.

The metadata analyzer 620 may extract information, required for image luminance and color gamut mapping and contrast enhancement, from the received metadata.

The metadata analyzer 620 may set the relationship between the input HDR image and the display 180 based on the metadata and display information.

Then, the metadata analyzer 620 may set a lookup table corresponding to a tone curve for the input HDR image and the display 180 based on the set relationship. In particular, the metadata analyzer 620 may renew the lookup table corresponding to the tone curve.

Then, the metadata analyzer 620 may renew and output a luminance lookup table and a color lookup table.

The metadata analyzer 620 may renew and output the luminance lookup table and the color lookup table on a per-image-scene or per-image-frame basis.

The luminance mapping unit 630 may perform mapping of luminance information of an image to be displayed based on the first lookup table set in the metadata analyzer 620.

Specifically, the luminance mapping unit 630 may adjust the luminance of an image to be displayed based on the first lookup table set in the metadata analyzer 620.

For example, the luminance mapping unit 630 may adjust the luminance of an image to be displayed based on brightness information of the HDR image, HDR image luminance information in the metadata, and information about luminance that is displayable on the display 180.

In another example, the luminance mapping unit 630 may adjust the luminance of an image to be displayed based on luminance information of the HDR image, HDR image luminance information in the metadata, information about luminance that is displayable on the display 180, and setting input.

In a further example, the luminance mapping unit 630 may adjust the luminance of an image to be displayed on a per-image-scene or per-image-frame basis of the HDR image.

The luminance mapping unit 630 may vary a saturation section upon luminance setting based on maximum luminance information of the HDR image.

The luminance mapping unit 630 may adjust the saturation section upon luminance setting so as to be reduced as the maximum luminance level is increased.

The luminance mapping unit 630 may adjust the saturation section upon luminance setting so as to be reduced as the set luminance level is increased.

The luminance mapping unit 630 may perform luminance mapping in consideration of the metadata and the brightness of the HDR image so that desired image brightness is achieved.

The luminance mapping unit 630 may perform mapping of the image by additionally considering adjusted contrast.

The luminance mapping unit 630 may perform 1D lookup table (LUT) processing on each sub channel (e.g. YCbCr/RGB) of the HDR image.

The picture-quality processor 635 may perform picture-quality processing on the image, which has been adjusted to the set luminance.

Specifically, the picture-quality processor 635 may perform, for example, scaling, sharpness processing and contrast processing on the image, which has been adjusted to the set luminance.

The color mapping unit 640 may perform mapping of the color information of the image to be displayed based on the second lookup table set in the metadata analyzer 620.

In particular, the color mapping unit 640 may perform color mapping on the image that has been subjected to picture-quality processing.

Specifically, the color mapping unit 640 may adjust the color of the image to be displayed based on the second lookup table set in the metadata analyzer 620.

For example, the color mapping unit 640 may set the color of an image to be displayed based on color information of the HDR image, HDR image color information in the metadata, and information about colors that are displayable on the display 180.

In another example, the color mapping unit 640 may adjust the color of an image to be displayed based on color information of the HDR image, HDR image color information in the metadata, information about colors that are displayable on the display 180, and setting input.

In a further example, the color mapping unit 640 may set the color of an image to be displayed on a per-image-scene or per-image-frame basis of the HDR image.

The luminance mapping unit 630 may vary a saturation section upon luminance setting based on maximum luminance information of the HDR image.

The color gamut mapping unit 640 may adjust the saturation section upon color setting so as to be reduced as the maximum color level is increased.

The color gamut mapping unit 640 may adjust the saturation section upon color setting so as to be reduced as the set color level is increased.

The color gamut mapping unit 640 may perform color mapping in consideration of the metadata so that desired image colors are achieved.

The color gamut mapping unit 640 may perform 3×3 matrix calculation or 3D LUT processing on the input HDR image.

Here, a matrix coefficient or LUT data may be data generated in the metadata analyzer 620.

Next, FIG. 6B illustrates another example of the internal block diagram of the controller of FIG. 2 according to the present invention.

The controller 170b of FIG. 6B is similar to the controller 170a of FIG. 6A, but has a difference with respect to the sequence of operation of the color mapping unit 640 and the picture-quality processor 635.

That is, the color gamut mapping unit 640 of FIG. 6B may perform color mapping on the image that has been subjected to luminance mapping.

Then, the picture-quality processor 635 of FIG. 6B may perform picture-quality processing on the image that has been subjected to color mapping.

While FIGS. 6A and 6B illustrate a discrete type HDR image signal processing method in which luminance mapping and color mapping are separately processed, in the present invention, luminance mapping and color mapping may be performed at the same time. This will be described below with reference to FIG. 6C.

Next, FIG. 6C illustrates a further example of the internal block diagram of the controller of FIG. 2 according to the present invention.

The controller 170c of FIG. 6C is similar to the controller 170a of FIG. 6A, but has a difference in that the luminance mapping unit 630 and the color gamut mapping unit 640 are replaced by a luminance and color gamut mapping unit 630b. The following description is focused on the difference.

The metadata analyzer 620 of FIG. 6C may set a third lookup table for setting the luminance and color of an image to be displayed based on brightness information of the HDR image, HDR image luminance information in the metadata, information about luminance that is displayable on the display 180, HDR image color information in the metadata, and information about colors that are displayable on the display 180.

The luminance and color gamut mapping unit 630b may perform mapping of luminance information and color information of the image to be displayed based on the set third lookup table.

Accordingly, the luminance and color gamut mapping unit 630b may simultaneously adjust the luminance and color of an image to be displayed based on the set luminance information and the set color information.

The luminance and color gamut mapping unit 630b may perform 3D LUT processing by simultaneously applying sub channel information of the image. At this time, LUT data may be data that are automatically or manually generated in the metadata analyzer 620.

Figure 7A:

FIG. 7A illustrates an example of a general luminance mapping method in the metadata analyzer 620.

The metadata analyzer 620 may include an electro-optic transfer function (EOTF) unit 710 for an image, a luminance tone mapping unit 720, and an opto-electronic transfer function (OETF) unit 730 for a display.

The EOTF unit 710 for an image may perform an EOTF in order to offset OETF effects applied to an input image.

That is, the EOTF unit 710 for an image may change the luminance value of an input image from a gamma domain to a linear domain.

The luminance tone mapping unit 720 may convert the luminance of the input image into display luminance via a mapping function.

At this time, the mapping function may be represented by an LUT. The LUT may be composed based on image luminance information in metadata and information about luminance that is displayable on the display 180 among display information.

Next, the OETF unit 730 for a display outputs an image by applying an OETF, corresponding to the EOTF, of a target display.

Because each unit of FIG. 7A may be applied in various color spaces, such as RGB, YCbCr, LAB and LUV, it is necessary to match color formats between blocks at the input and output of each unit using a color space conversion device.

Figure 7B:
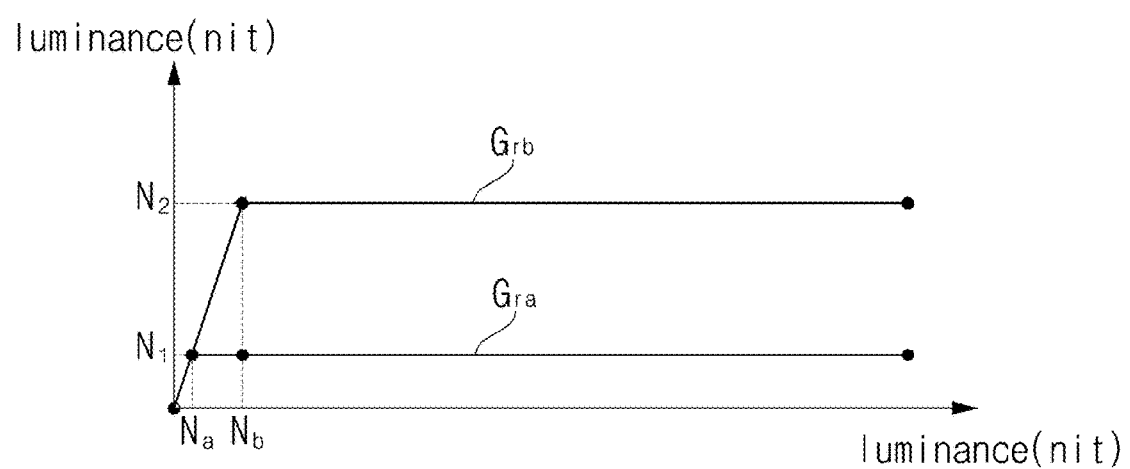

FIG. 7B is a view illustrating image luminance information included in metadata and information about luminance that is displayable on the display 180 among display information.

In FIG. 7B, the graph $G_{ra}$ illustrates the case where the maximum luminance based on image luminance information is 10,000 nit and the maximum luminance that is displayable on the display is $N_a$.

When the luminance of an input image ranges from 0 to $N_a$, the luminance may be proportionately converted. In particular, the luminance $N_a$ of the input image may be converted to a luminance level $N_1$.

The input image may be displayed at the luminance level $N_1$, regardless of the luminance of the input image, in a saturation section after the maximum luminance $N_a$.

In the graph $G_{ra}$, $N_a$ may correspond to 100 nit and $N_1$ may correspond to 100 nit.

In FIG. 7B, the graph $G_{rb}$ illustrates the case where the maximum luminance based on image luminance information is 10,000 nit and the maximum luminance that is displayable on the display is $N_b$.

When the luminance of an input image ranges from 0 to $N_b$, the luminance may be proportionately converted. In particular, the luminance $N_b$ of the input image may be converted to a luminance level $N_2$.

The input image may be displayed at the luminance level $N_2$, regardless of the luminance of the input image, in a saturation section after the maximum luminance $N_b$.

In the graph $G_{rb}$, $N_b$ may correspond to 400 nit and $N_2$ may correspond to 400 nit.

Figure 7D:
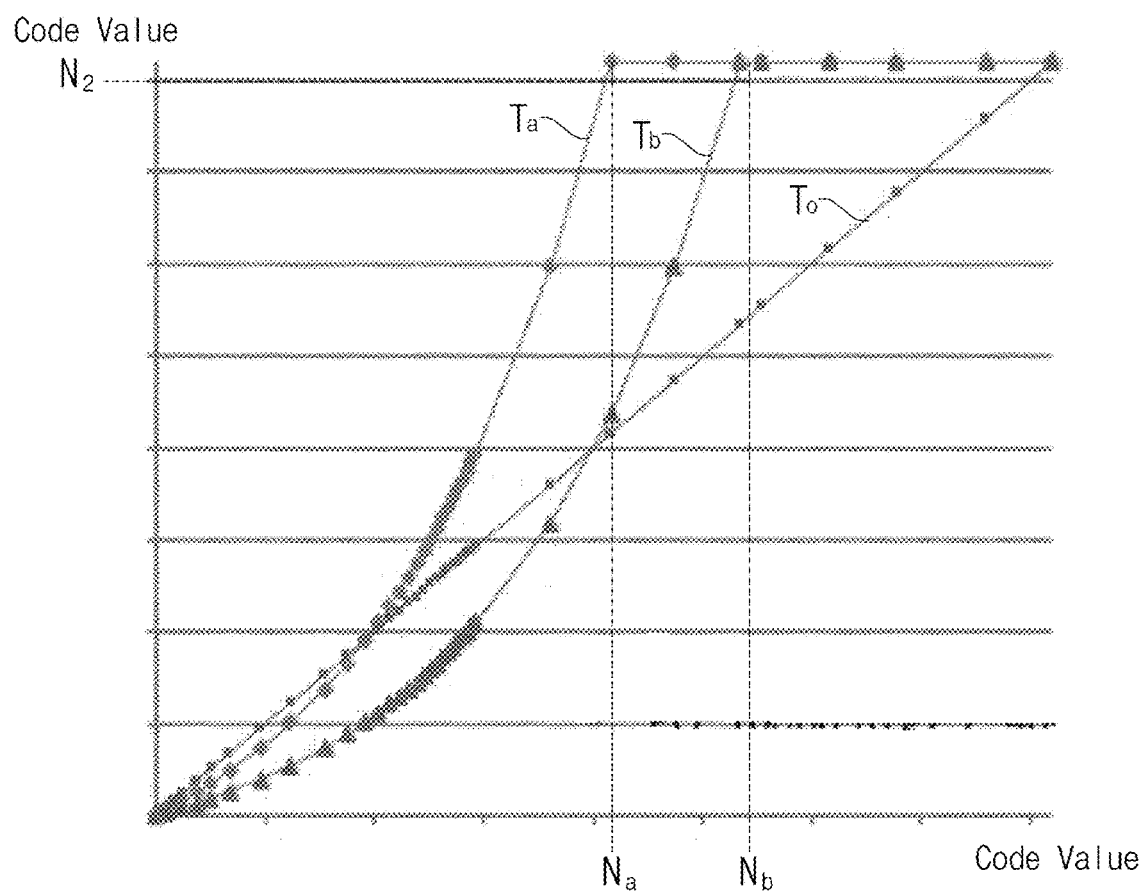

FIGS. 7B, 7C and 7D illustrate a method of combining three steps, performed by the three units 710, 720 and 730 of FIG. 7A, into one step.

The metadata analyzer 620 may set LUT data using image luminance information included in metadata and luminance information of a target display.

Then, the metadata analyzer 620 may compose mapping LUT data using respective OETF code values corresponding to respective luminance values of the input image.

For example, when the maximum luminance that is displayable on the display is $N_a$, the metadata analyzer 620 may compose mapping LUT data using the graph $G_{ua}$ of FIG. 7C and the graph $T_a$ of FIG. 7D.

In another example, when the maximum luminance that is displayable on the display is $N_b$, the metadata analyzer 620 may compose mapping LUT data using the graph $G_{ub}$ of FIG. 7C and the graph $T_b$ of FIG. 7D.

That is, the metadata analyzer 620 may compose mapping LUT data by combining and signal-processing the respective graphs of FIGS. 7B, 7C and 7D.

As illustrated in FIG. 7D, the length of a saturation section is reduced as the maximum luminance that is displayable on the display is increased. That is, the length of the saturation section is reduced at the graph $T_b$ compared to at the graph $T_a$.

As illustrated in FIGS. 7A to 7D, through the adjustment of the luminance value, such as the composition of mapping LUT data, the luminance value may be converted to only the maximum luminance after the saturation section because the luminance that is displayable on the target display is limited.

Therefore, the embodiment of the present invention proposes a method of adaptively adjusting the luminance of a display image using image brightness information during the operation of the metadata analyzer.

Figure 8A:
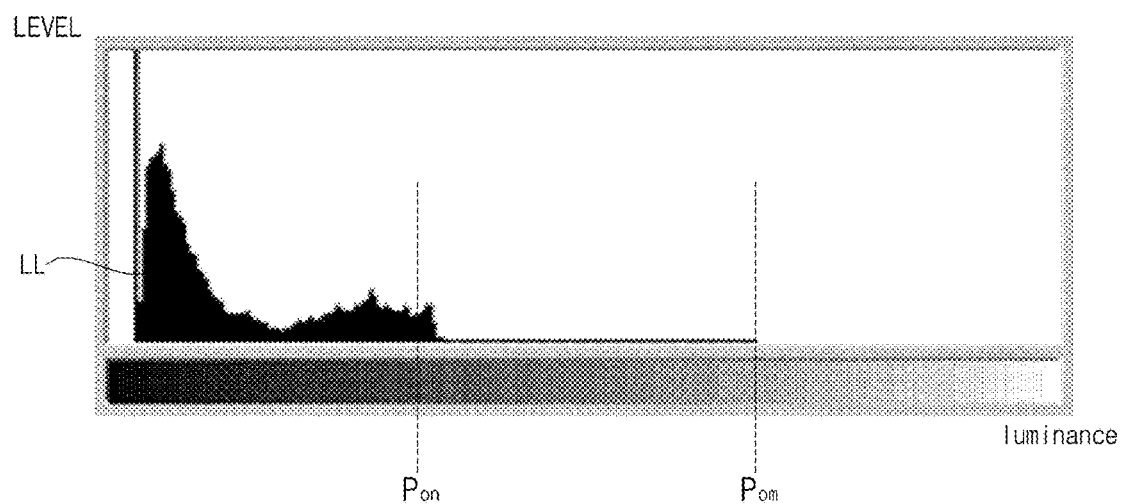

FIG. 8A is a histogram illustrating one example of the brightness information of an input image analyzed by the image analyzer 610.

Referring to FIG. 8A, "$P_{om}$" designates the maximum luminance of the input image, and "$P_{on}$" designates the N % luminance of the input image.

Figure 8B:
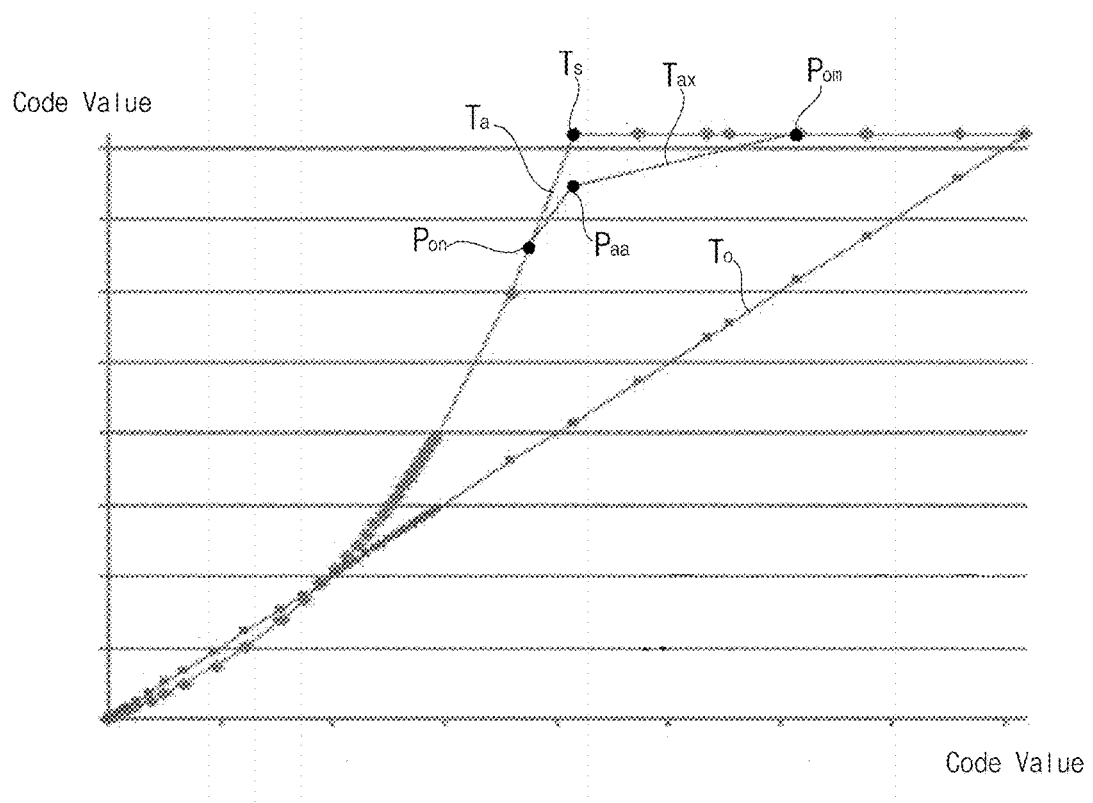

FIG. 8B illustrates one example of adaptive LUT data modification using image brightness information during the operation of the metadata analyzer.

The metadata analyzer 620 may set an LUT for setting the luminance of an image to be displayed based on set highest N % luminance point information and maximum luminance information of the input image.

Specifically, the metadata analyzer 620 may renew the LUT for setting the luminance of an image to be displayed based on information about luminance that is displayable on the display, set highest N % luminance point information, and maximum luminance information of the input image.

In FIG. 8B, "Ta" designates the graph corresponding to the first LUT for setting the luminance of an image to be displayed when the luminance that is displayable on the display is $N_a$ nit (e.g. 100 nit).

The metadata analyzer 620 may perform control to adaptively vary the first LUT when the maximum luminance of the input image is greater than a saturation point of displayable luminance.

In particular, the metadata analyzer 620 may perform control to adaptively vary the first LUT using information about the highest N % luminance point set by, for example, user luminance setting input and the maximum luminance information of the input image.

In FIG. 8B, "$T_{ax}$" designates the graph corresponding to the renewed first LUT for setting the luminance of an image to be displayed based on set highest N % luminance point information and maximum luminance information of the input image in the case where the luminance that is displayable on the display is $N_a$ nit (e.g. 100 nit).

In the graph "$T_{ax}$", "$P_{on}$" designates a point corresponding to the highest N % luminance point, "$P_{aa}$" designates a point corresponding to an existing saturation point $T_s$, and "$P_{om}$" designates a new saturation point corresponding to the maximum luminance information.

That is, through comparison of "$T_{ax}$" and "$T_a$", the metadata analyzer 620 may perform control to reduce the saturation section upon luminance level conversion.

The metadata analyzer 620 may perform control to reduce a saturation section upon luminance setting as the maximum luminance level is increased.

The metadata analyzer 620 may perform control to reduce a saturation period upon luminance setting as the set luminance level is increased.

Accordingly, as the saturation section is reduced upon luminance level conversion with respect to the input HDR image, various levels of luminance may be displayed.

The metadata analyzer 620 enables the display of various levels of luminance by providing a plurality of conversion sections (including a first section between $P_{on}$ and $P_{aa}$ and a second section between $P_{aa}$ and $P_{om}$) between the point $P_{on}$ corresponding to the highest N % luminance point and the new saturation point $P_{om}$ corresponding to the maximum luminance information.

In addition to the luminance adjustment, contrast adjustment may be performed. This will be described below with reference to FIGS. 9A to 9C.

Figure 9A:
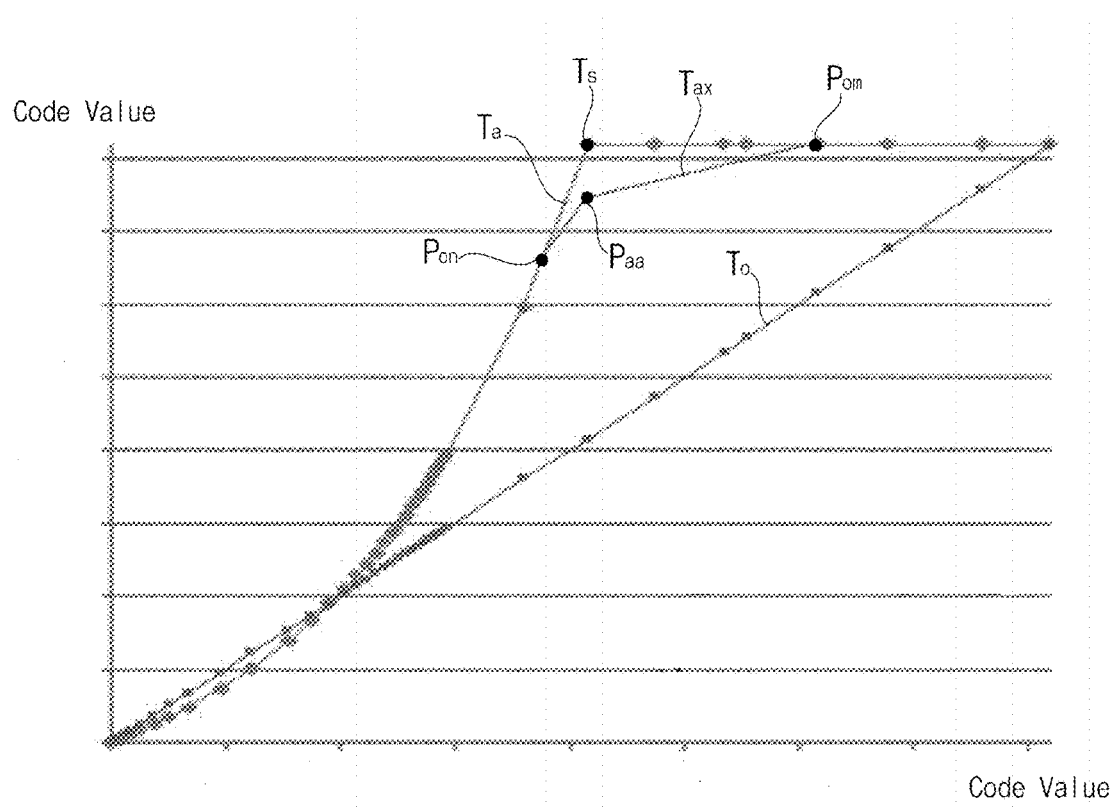
Figure 9B:
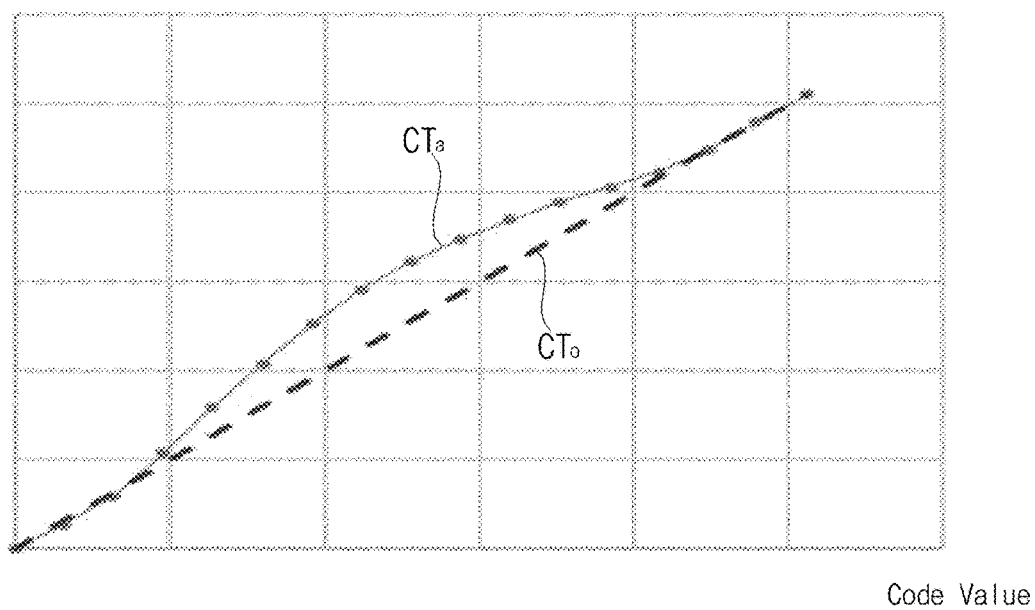
Figure 9C:
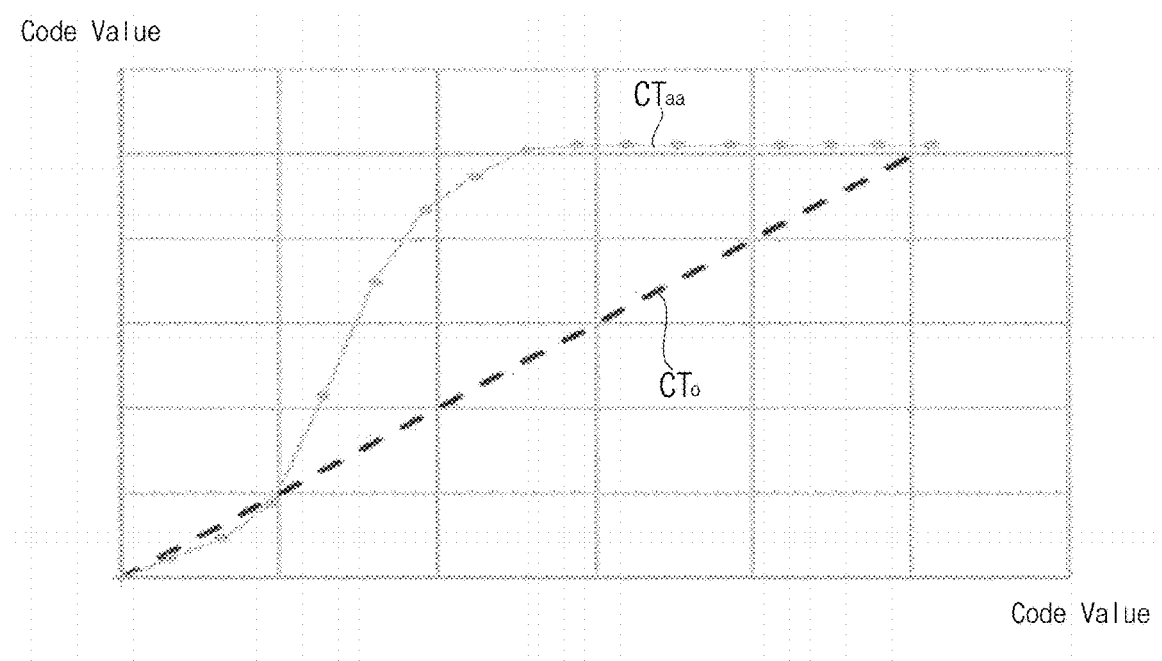

FIGS. 9A to 9C are views referenced to explain a method of generating an image having increased perceived depth and an increased contrast ratio based on the viewer's taste.

Like FIG. 8B, FIG. 9A illustrates an example of adaptive LUT data modification using image brightness information during the operation of the metadata analyzer. In particular, FIG. 9A illustrates a luminance mapping lookup table. A description related to FIG. 9A may be replaced by the description of FIG. 8B, and thus will be omitted below.

FIG. 9B illustrates a contrast mapping lookup table.

"$CT_o$" designates the graph corresponding to a reference contrast lookup table, and "$GT_a$" designates a lookup table based on user contrast setting input.

The metadata analyzer 620 may set the lookup table corresponding to the graph $CT_a$ based on user contrast setting input.

FIG. 9C illustrates a lookup table in the case where luminance mapping and contrast mapping are performed at the same time.

"$CT_o$" is the graph corresponding to a reference contrast lookup table, and "$CT_{aa}$" is the graph corresponding to a luminance and contrast lookup table based on user luminance setting input and user contrast setting input.

That is, the metadata analyzer 620 may set a one-step LUT by connecting the luminance lookup table of FIG. 9A and the contrast lookup table of FIG. 9B to each other. The degree of contrast enhancement may also be adjusted by user selection.

Accordingly, the luminance mapping unit 630 may adjust the luminance of the input image using the lookup table corresponding to the graph $CT_{aa}$.

The metadata analyzer 620 may set a color lookup table for color adjustment. In particular, the color lookup table may be set similarly to the luminance lookup table.

The metadata analyzer 620 may perform 3×3 matrix calculation or 3D LUT processing for color adjustment.

Figure 10:
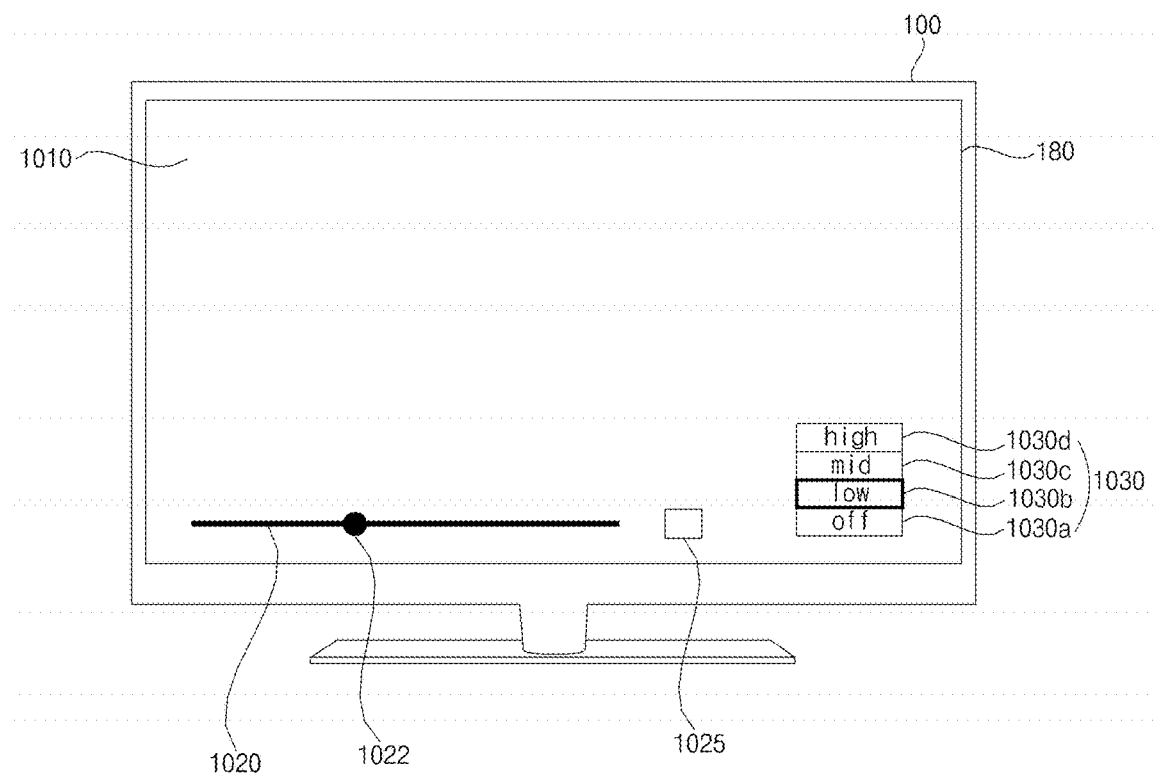

FIG. 10 illustrates the display of objects in relation to user luminance setting input and user contrast setting input.

The controller 170 in the image display apparatus 100 may perform control to display, for example, a luminance setting object 1020, an automatic setting object 1025, and a contrast setting object 1030, as illustrated in FIG. 10, when an image, and more particularly, an HDR image is input.

The controller 170 in the image display apparatus 100 may determine the input of the HDR image using, for example, metadata, and may perform control to display the luminance setting object 1020, the automatic setting object 1025, and the contrast setting object 1030 as illustrated in FIG. 10 when the HDR image is input.

When a luminance setting bar in the luminance setting object 1020 is set so as to move to a specific position using a directional key (leftward/rightward key) or the pointer (see 205 in FIG. 4A) of the remote control device 200, the controller 170 in the image display apparatus 100 may receive luminance setting input corresponding to the specific position.

Then, the controller 170 in the image display apparatus 100, as described above, may perform control to display an image, the luminance of which is adjusted by adjusting the luminance of the HDR image based on the luminance setting input.

When the automatic setting object 1025 is selected using an "enter" key or the pointer (205 in FIG. 4A) of the remote control device 200, the controller 170 in the image display apparatus 100 may receive, for example, automatic luminance setting input.

Then, the controller 170 in the image display apparatus 100, as described above, may perform control to display an image, the luminance of which is adjusted by adjusting the luminance of the HDR image based on the automatic luminance setting input.

When a specific position in the contrast setting object 1030 is focused using a directional key (leftward/rightward key) or the pointer (see 205 in FIG. 4A) of the remote control device 200, the controller 170 in the image display apparatus 100 may receive contrast setting input corresponding to the specific position FIG. 10 illustrates that a "low" item 1030*b* among a "high" item 1030*d*, a "mid" item 1030*c*, the "low" item 1030*b*, and an "off" item 1030*a* receives a focus.

The controller 170 in the image display apparatus 100, as described above, may perform control to display an image, the contrast of which is adjusted by adjusting the contrast of the HDR image based on contrast setting input.

Although not illustrated in FIG. 10, the controller 170 in the image display apparatus 100 may perform control to display a color setting object.

Then, the controller 170 in the image display apparatus 100, as described above, may perform control to display an image, the color of which is adjusted by adjusting the color of the HDR image based on color setting input.

Figure 11A:
Figure 11B:
Figure 11C:
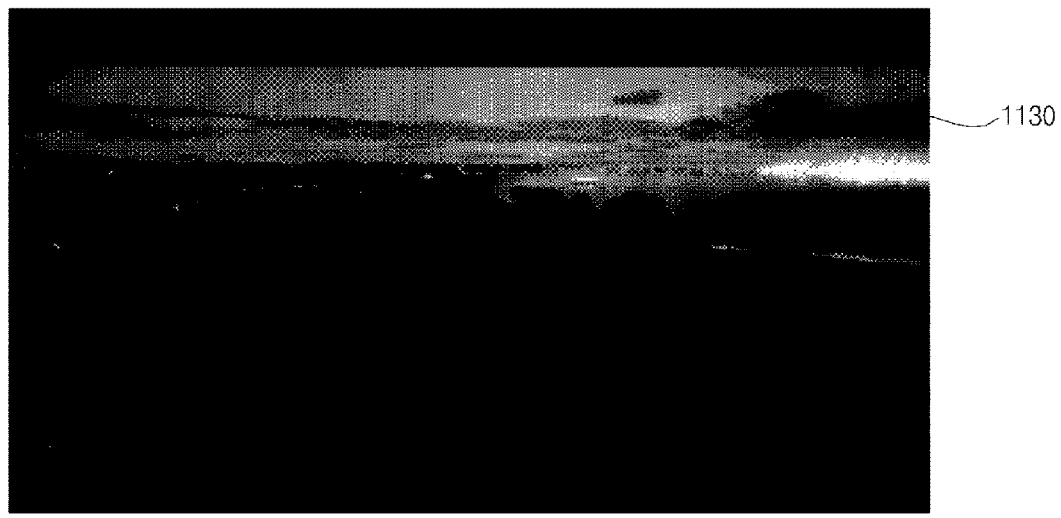

FIG. 11A illustrates one example of an input HDR image 1110, FIG. 11B illustrates an image 1120, the luminance of which is adjusted based on the lookup table corresponding to the graph $T_a$ of FIG. 8B, and FIG. 11C illustrates an image 1130, the luminance of which is adjusted based on the lookup table corresponding to the graph $T_{ax}$ of FIG. 8B.

It can be appreciated via comparison of FIGS. 11A to 11C that the image 1130 of FIG. 11C, the luminance of which is adjusted, shows enriched gradation compared to that of FIG. 11B, and is ultimately displayed considerably similarly to the input HDR image 1110.

In particular, it can be appreciated that the image 1130 shows dark space gradation in a dark scene and is displayed considerably similarly to the input HDR image 1110.

Figure 12A:
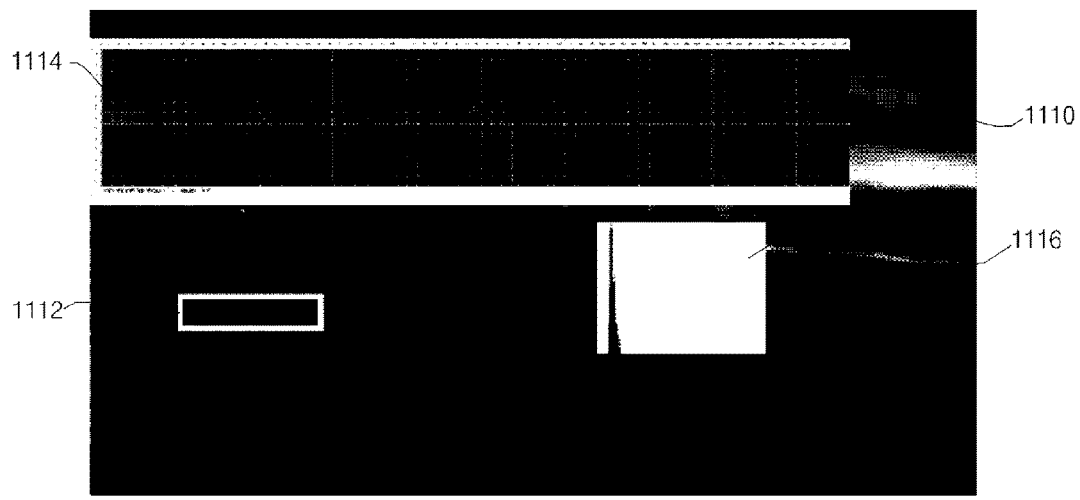
Figure 12B:
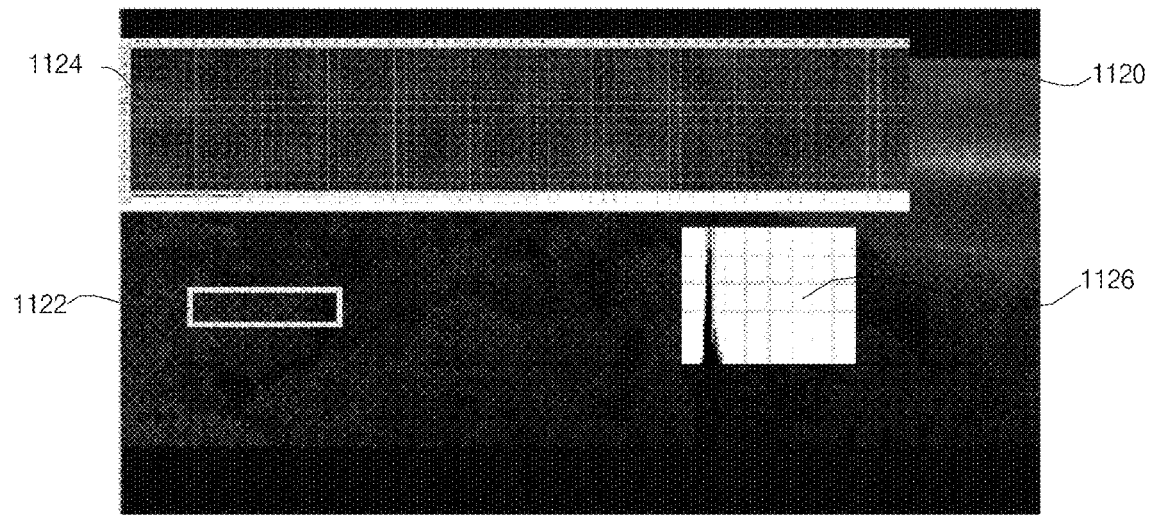
Figure 12C:
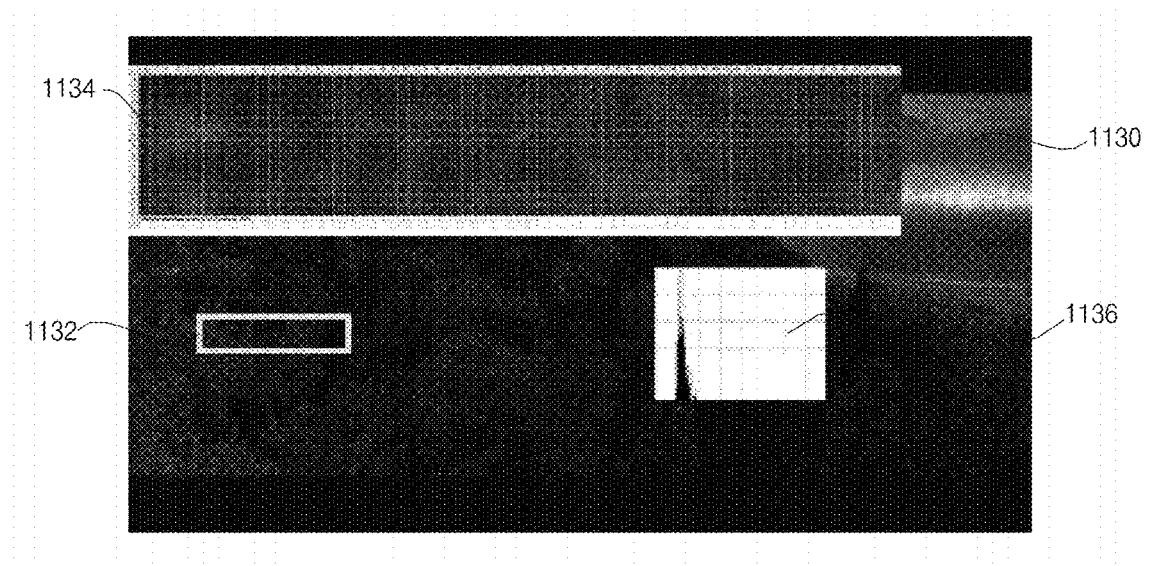

FIGS. 12A to 12C are views illustrating local brightness analysis histograms with respect to a dark area in each image of FIGS. 11A to 11C.

FIG. 12A illustrates a dark area 1112 in the input HDR image 1110, an enlarged area 1114 thereof, and a local brightness histogram 1116 with respect to the corresponding area.

FIG. 12B illustrates a dark area 1122 in the image 1120, the luminance of which is adjusted using the lookup table corresponding to the graph $T_a$ of FIG. 8B, an enlarged area 1124 thereof, and a local brightness histogram 1126 with respect to the corresponding area.

FIG. 12C illustrates a dark area 1132 in the image 1130, the luminance of which is adjusted using the lookup table corresponding to the graph $T_{ax}$ of FIG. 8B, an enlarged area 1134 thereof, and a local brightness histogram 1136 with respect to the corresponding area.

It can be appreciated via the comparison of respective local brightness histograms that the local brightness histogram 1116 of the input HDR image 1110 and the local brightness histogram 1136 in the image 1130, the luminance of which is adjusted, are similar to each other.

Figure 12D:
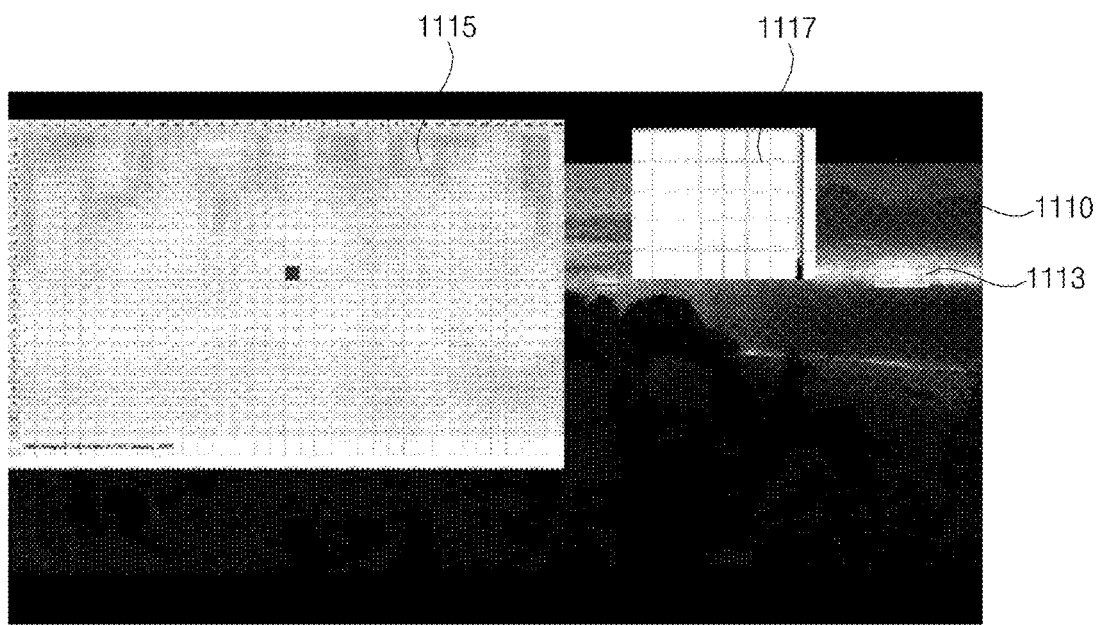
Figure 12E:
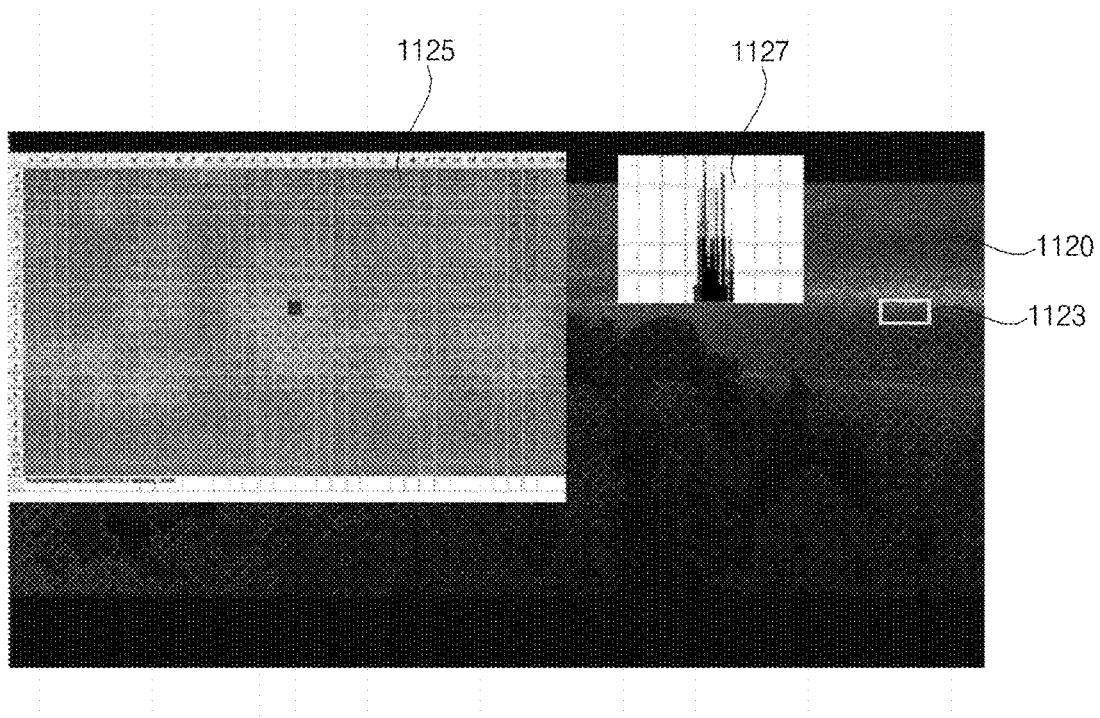
Figure 12F:
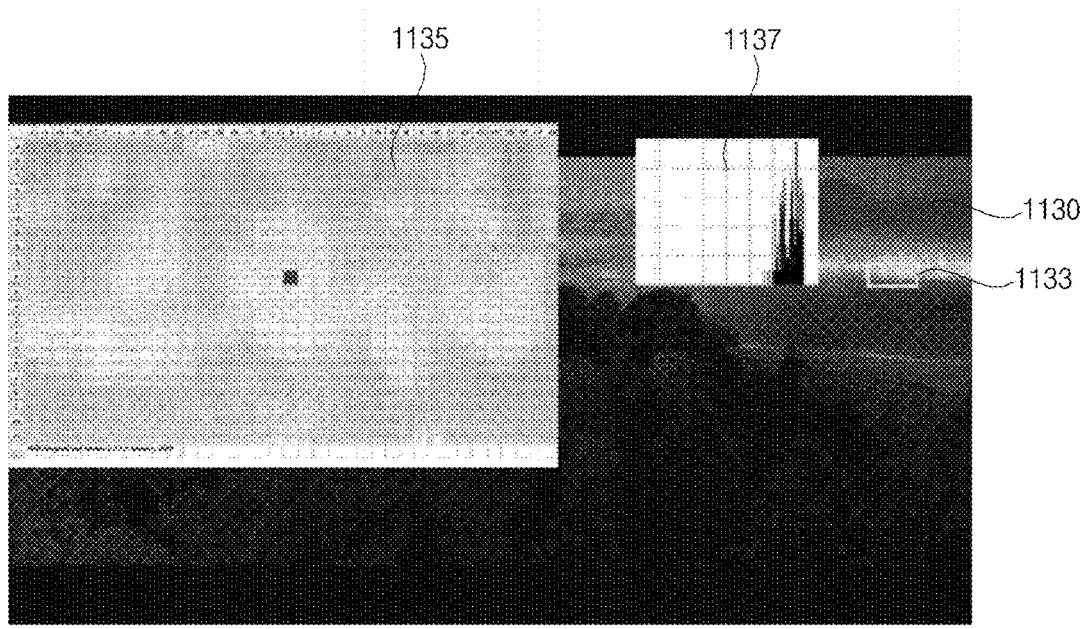

FIGS. 12D to 12F are views illustrating local brightness analysis histogram with respect to a bright area in each image of FIGS. 11A to 11C.

FIG. 12D illustrates a bright area 1113 in the input HDR image 1110, an enlarged area 1115 thereof, and a local brightness histogram 1117 with respect to the corresponding area.

FIG. 12E illustrates a bright area 1123 in the image 1120, the luminance of which is adjusted using the lookup table corresponding to the graph $T_a$ of FIG. 8B, an enlarged area 1125 thereof, and a local brightness histogram 1127 with respect to the corresponding area.

FIG. 12F illustrates a bright area 1133 in the image 1130, the luminance of which is adjusted using the lookup table corresponding to the graph $T_{ax}$ of FIG. 8B, an enlarged area 1135 thereof, and a local brightness histogram 1137 with respect to the corresponding area.

It can be appreciated via the comparison of respective local brightness histograms that the local brightness histogram 1117 of the input HDR image 1110 and the local brightness histogram 1137 in the image 1130, the luminance of which is adjusted, are similar to each other.

Figure 13A:
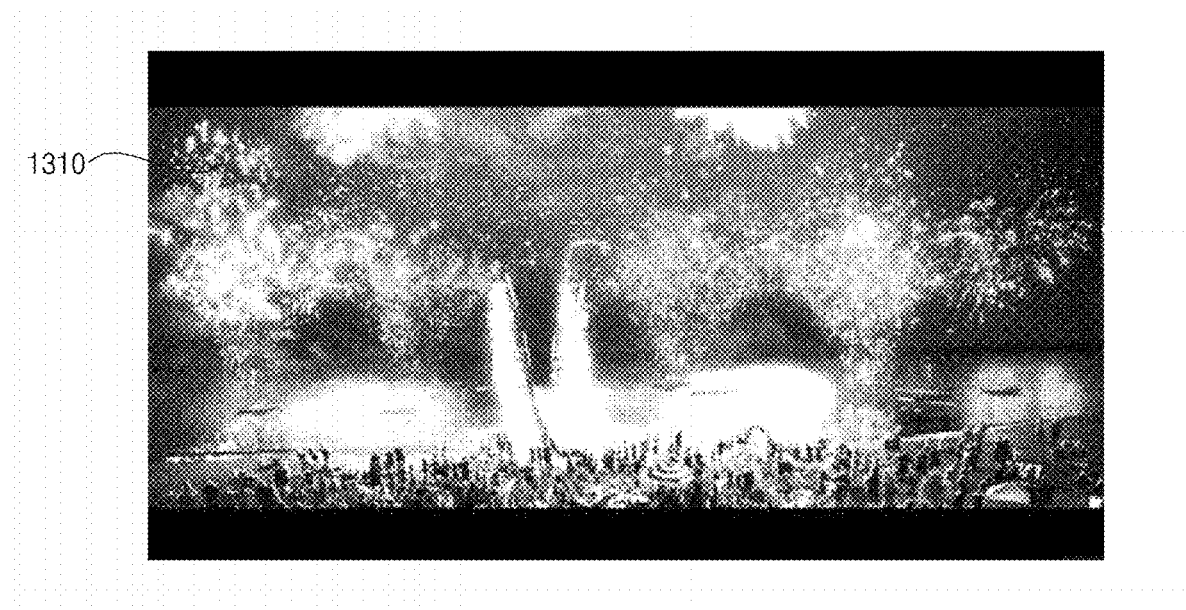
Figure 13B:
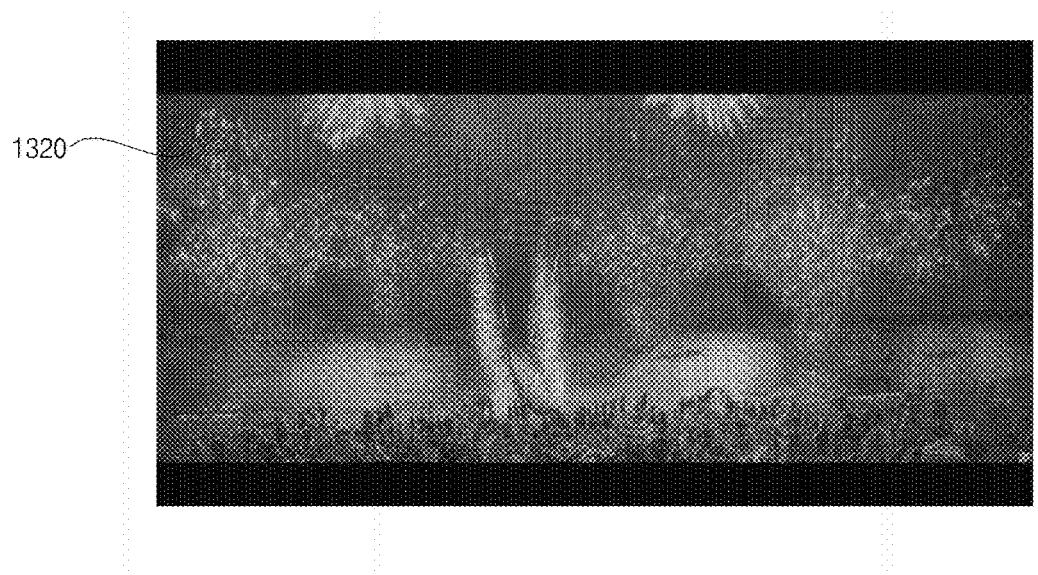
Figure 13C:
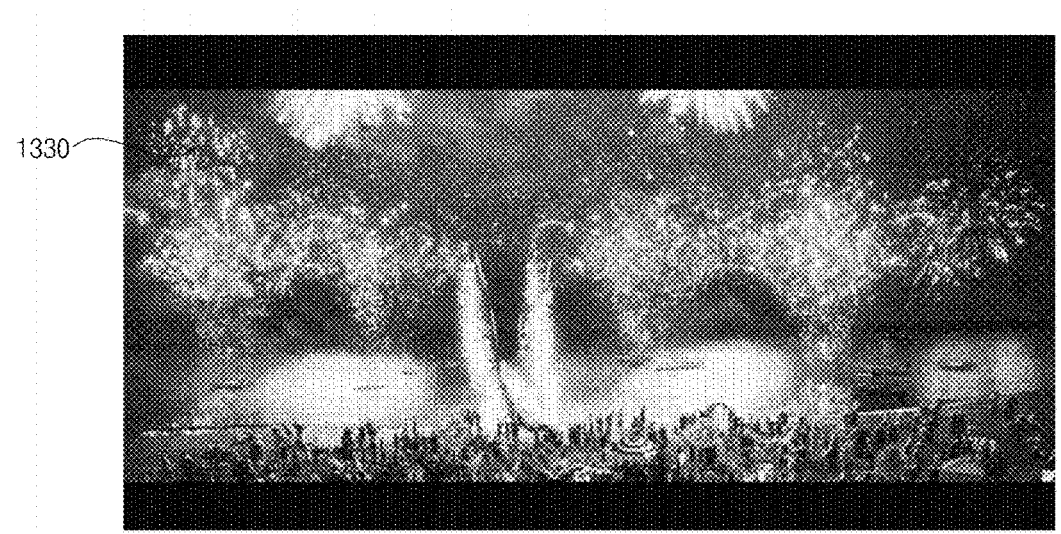

FIG. 13A illustrates another example of an input HDR image 1310, FIG. 13B illustrates an image 1320, the luminance of which is adjusted using the lookup table corresponding to the graph $T_a$ of FIG. 8B, and FIG. 13C illustrates an image 1330, the luminance of which is adjusted using the lookup table corresponding to the graph $T_{ax}$ of FIG. 8B.

Figure 14A:
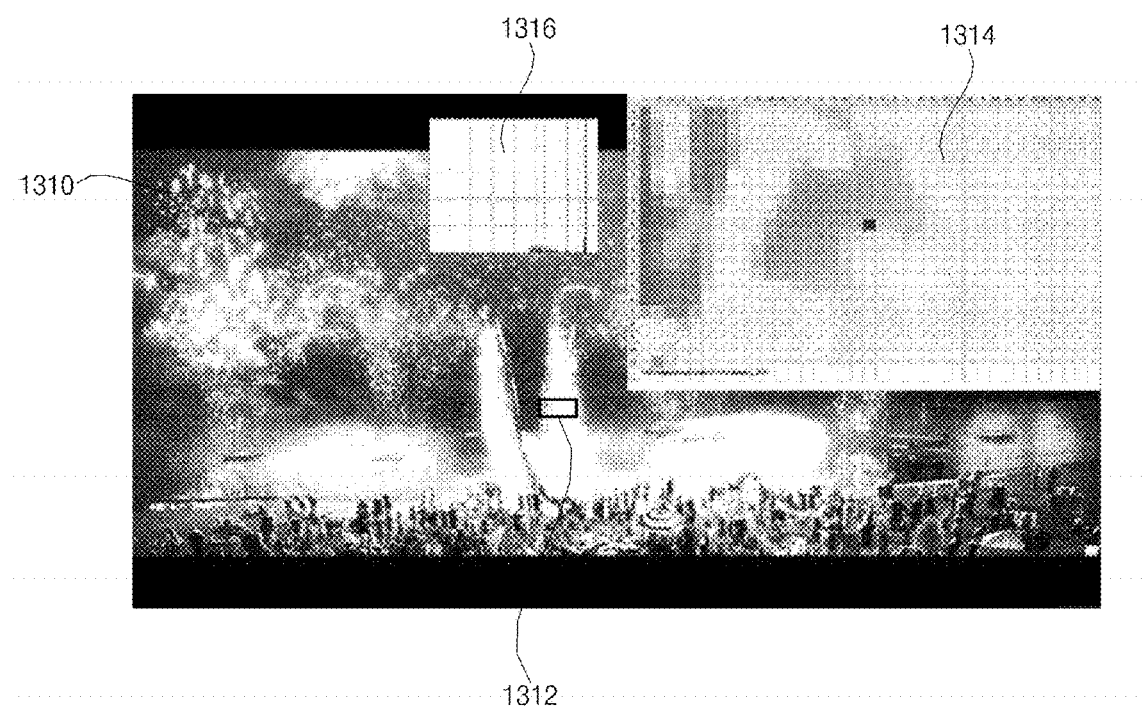
Figure 14B:
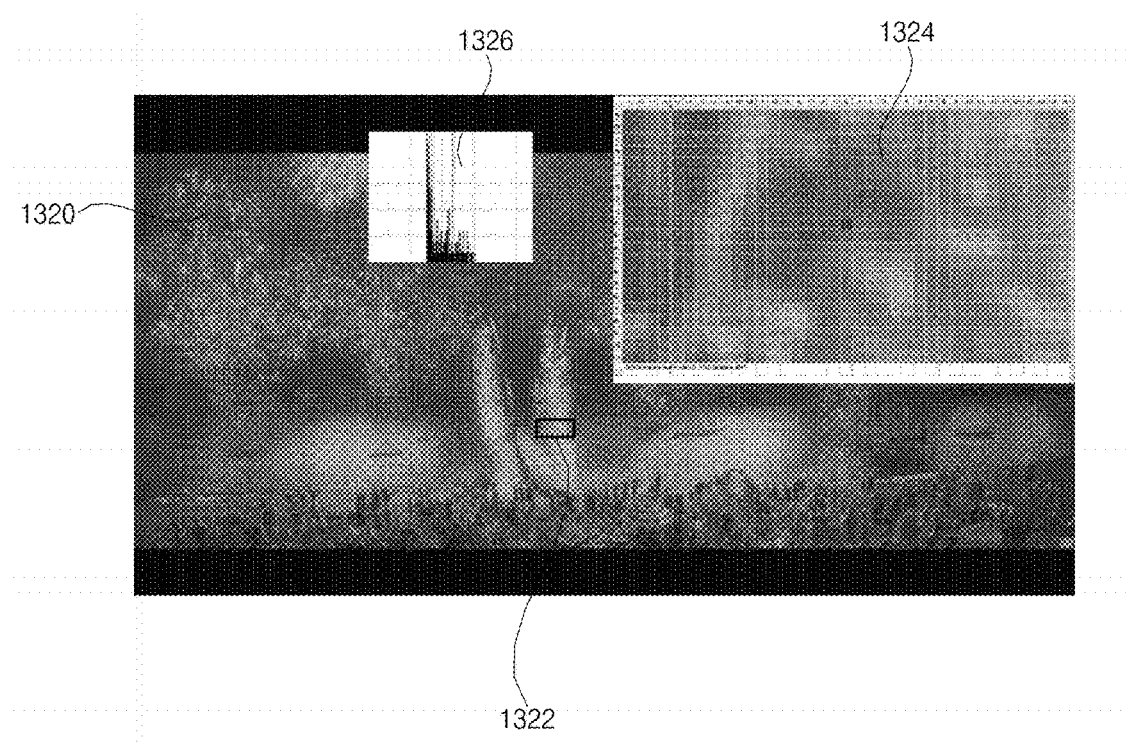
Figure 14C:
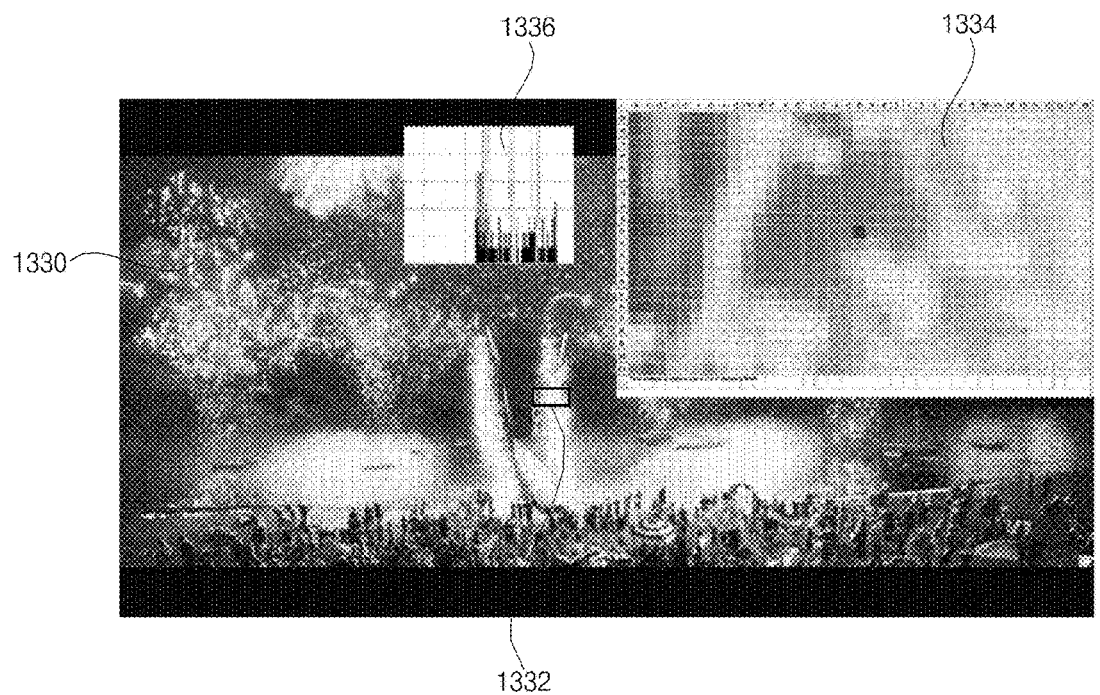

FIGS. 14A to 14C are views illustrating local brightness analysis histograms with respect to a bright area in each image of FIGS. 13A to 13C.

FIG. 14A illustrates a bright area 1312 in the input HDR image 1310, an enlarged area 1314 thereof, and a local brightness histogram 1316 with respect to the corresponding area.

FIG. 14B illustrates a bright area 1322 in the image 1320, the luminance of which is adjusted using the lookup table corresponding to the graph $T_a$ of FIG. 8B, an enlarged area 1324 thereof, and a local brightness histogram 1326 with respect to the corresponding area.

FIG. 14C illustrates a bright area 1332 in the image 1330, the luminance of which is adjusted using the lookup table corresponding to the graph $T_{ax}$ of FIG. 8B, an enlarged area 1334 thereof, and a local brightness histogram 1336 with respect to the corresponding area.

It can be appreciated via the comparison of respective local brightness histograms that the local brightness histogram 1316 of the input HDR image 1310 and the local brightness histogram 1336 in the image 1330, the luminance of which is adjusted, are similar to each other.

Figure 15A:
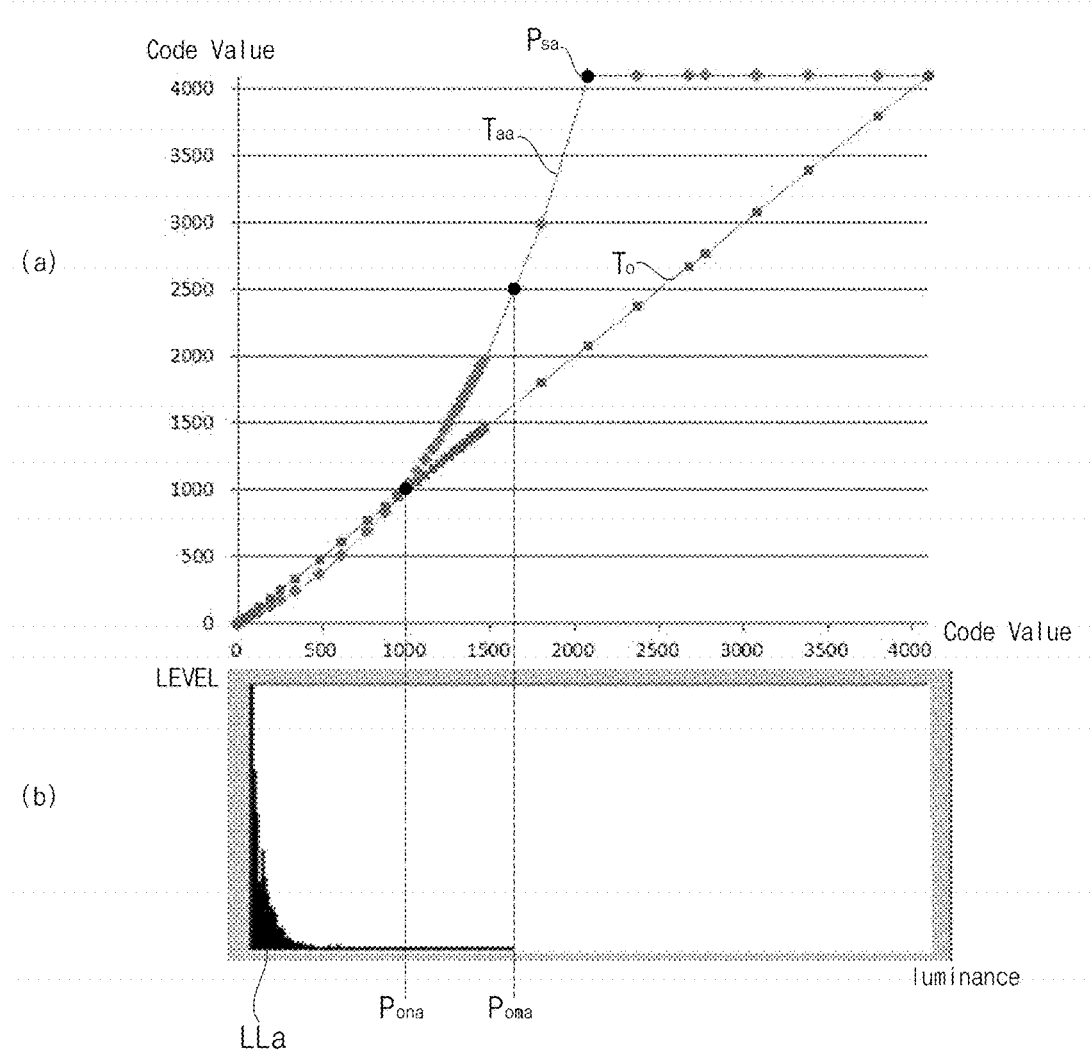
Figure 15B:
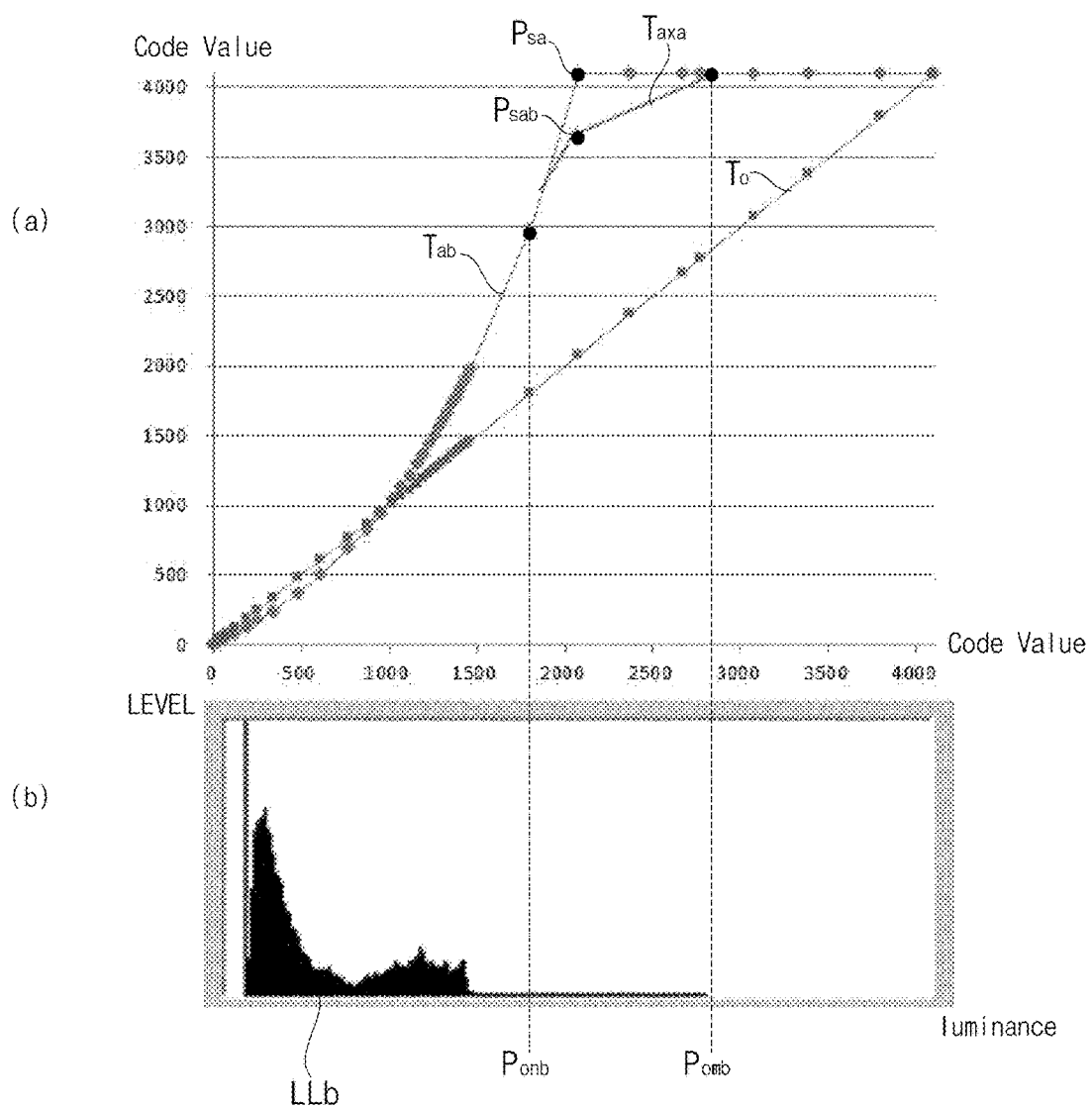
Figure 15C:
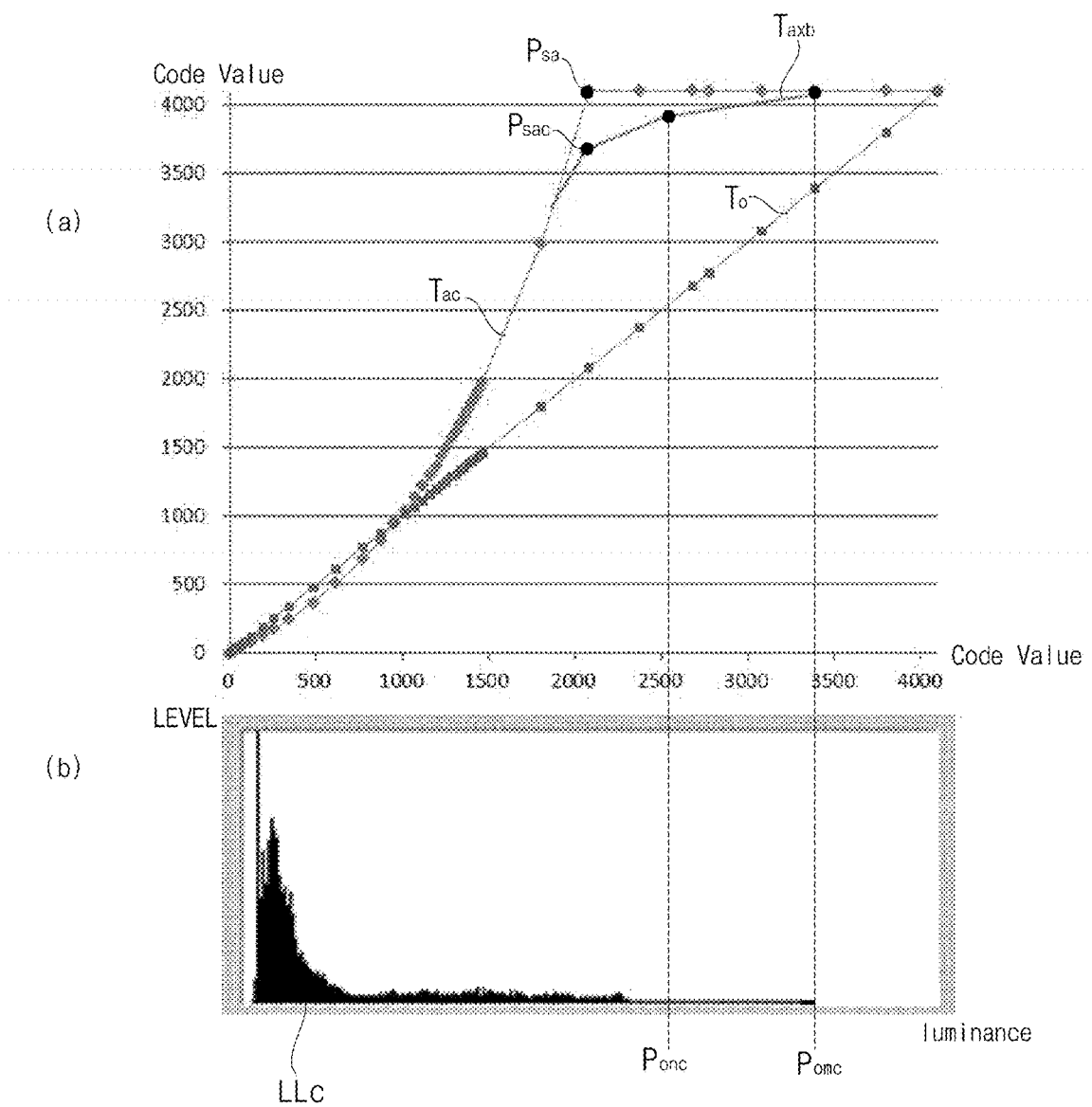

FIGS. 15A to 15C illustrate variation in an LUT for setting the luminance of an image to be displayed based on set highest N % luminance point information and maximum luminance information of an input image.

In particular, the metadata analyzer 620 may vary an LUT for setting the luminance of an image to be displayed based on set highest N % luminance point information and maximum luminance information of an input image.

The metadata analyzer 620 may set a lookup table based on information about the maximum displayable luminance of the display, as illustrated in FIG. 15A, when a set highest N % luminance point and the maximum luminance of the input image are lower than a saturation point of the displayable luminance.

In FIG. 15A, (b) illustrates a brightness histogram LLa of the input image in the case where the set highest N % luminance point $P_{ona}$ and the maximum luminance of the input image $P_{oma}$ are lower than the saturation point $P_{sa}$ of the displayable luminance.

Accordingly, the metadata analyzer 620 may set a lookup table corresponding to the graph $T_{aa}$. The lookup table corresponding to the graph $T_{aa}$ may be set based on information about the maximum displayable luminance of the display.

That is, the metadata analyzer 620 may maintain the existing graph $T_{aa}$ when the set highest N % luminance point and the maximum luminance of the input image are lower than the saturation point of the displayable luminance.

Next, the metadata analyzer 620 may set a lookup table having a plurality of sections between a set highest N % luminance point and the maximum luminance of the input image, as illustrated in FIG. 15B, when the saturation point of the displayable luminance is located between the set highest N % luminance point and the maximum luminance of the input image.

In FIG. 15B, (b) illustrates a brightness histogram LLb of the input image in the case where the saturation point $P_{sab}$ of the displayable luminance is located between the set highest N % luminance point $P_{onb}$ and the maximum luminance of the input image $P_{omb}$.

When the highest N % luminance point is located to the left of the saturation point of the displayable luminance, as illustrated in (a) of FIG. 15B, the metadata analyzer 620 may apply a user setting gain to the y value of the saturation point of the displayable luminance on the basis of a straight line between the highest N % luminance point and the maximum luminance of the input image.

Meanwhile, when the highest N % luminance point is located to the right of a point immediately before the saturation point of the displayable luminance, the metadata analyzer 620 may apply a user setting gain to the y value of the saturation point of the displayable luminance on the basis of a straight line between the point immediately before the saturation point of the displayable luminance and the maximum luminance of the input image.

In this way, the metadata analyzer 620 may set a lookup table corresponding to the graph $T_{axa}$. The lookup table corresponding to the graph $T_{axa}$ may be set based on information about the maximum displayable luminance of the display, user setting luminance input, and the maximum luminance of the input image.

That is, the metadata analyzer 620 may maintain the existing graph $T_{ab}$ in a section before the set highest N % luminance point, and may set the renewed graph $T_{axa}$ in a section after the set highest N % luminance point and before the maximum luminance of the input image.

Next, the metadata analyzer 620 may set a lookup table having a plurality of sections after the saturation point of the displayable luminance, as illustrated in FIG. 15C, when the set highest N % luminance point and the maximum luminance of the input image are higher than the saturation point of the displayable luminance.

In FIG. 15C, (b) illustrates a brightness histogram LLc of the input image in the case where the set highest N % luminance point $P_{onc}$ and the maximum luminance of the input image $P_{omc}$ are higher than the saturation point $P_{sac}$ of the displayable luminance.

When the highest N % luminance point $P_{onc}$ and the maximum luminance of the input image $P_{omc}$ are located to the right of the saturation point $P_{sac}$ of the displayable luminance, the metadata analyzer 620 may apply a user setting gain to the y value between the saturation point $P_{sac}$ and the highest N % luminance point $P_{onc}$. Here, the gain may be a value between 0 and 1.

The metadata analyzer 620 may apply a secondary user setting gain (0~1.0) to the y value between the highest N % luminance point $P_{onc}$ and the maximum luminance of the input image $P_{omc}$.

Accordingly, the metadata analyzer 620 may set a lookup table corresponding to the graph $T_{axb}$. The lookup table corresponding to the graph $T_{axb}$ may be set based on information about the maximum displayable luminance of the display, user setting luminance input, and the maximum luminance of the input image.

That is, the metadata analyzer 620 may maintain the existing graph $T_{ac}$ in a section before the saturation point $P_{sac}$ of the displayable luminance, and may set the renewed graph $T_{axb}$ in a section after the saturation point $P_{sac}$ of the displayable luminance and before the maximum luminance of the input image.

In this way, an image, the luminance of which is adjusted over a wide range, compared to the input image, may be displayed.

Figure 16B:
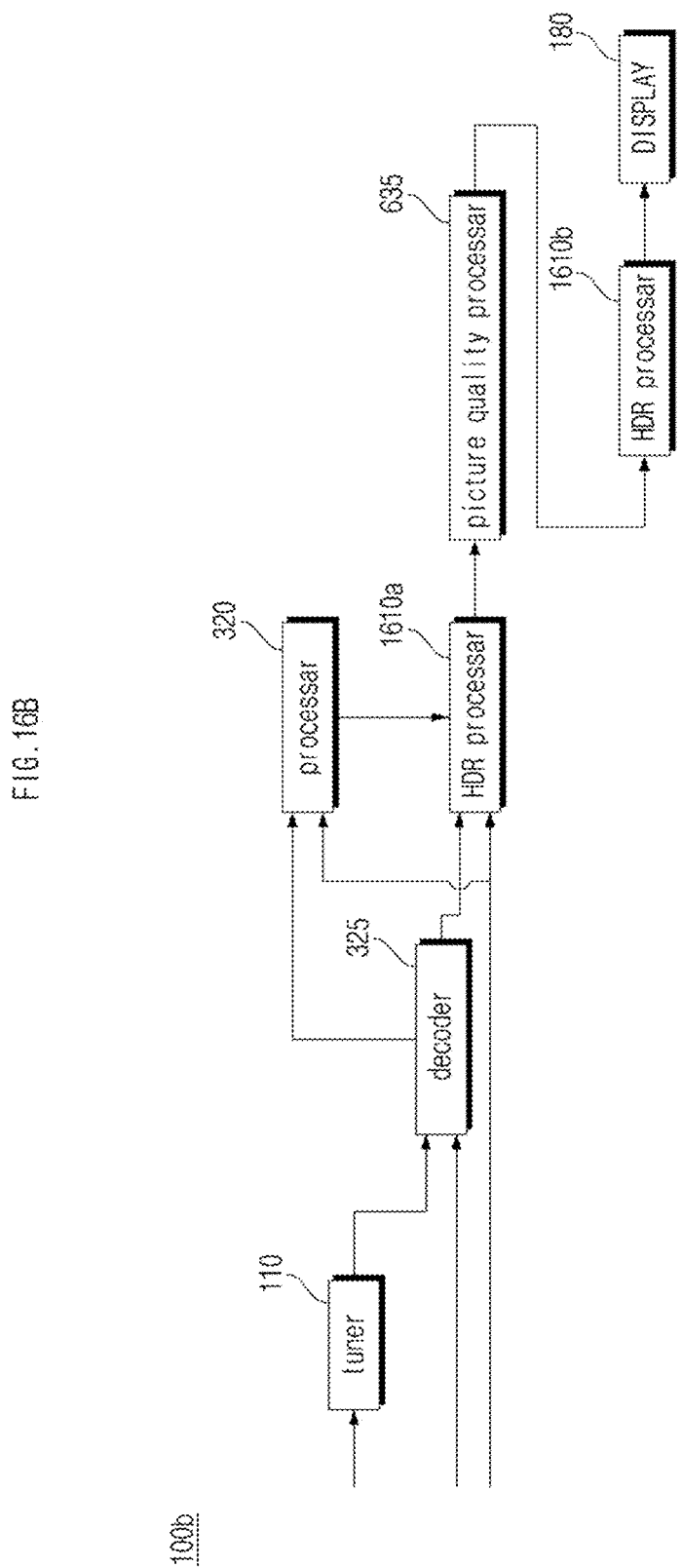

FIGS. 16A and 16B illustrate various examples of the internal block diagram of the image display apparatus of FIG. 1.

An image display apparatus 100a of FIG. 16A may include the tuner 110, the image decoder 325, the processor 320, an HDR processor 1610, the picture-quality processor 635, and the display 180.

The tuner 110, the image decoder 325, and the processor 320 may be the same as each unit of FIGS. 2 and 3.

The processor 320 may transmit an HDR image and metadata to the HDR processor 1610.

The HDR processor 1610 may include the image analyzer 610, the metadata analyzer 620, the luminance mapping unit 630, and the color mapping unit 640 of FIG. 6B.

Alternatively, the HDR processor 1610 may include the metadata analyzer 620, the luminance mapping unit 630 and the color mapping unit 640 of FIG. 6B. In this case, the processor 320 may include the image analyzer 610 of FIG. 6B.

An image display apparatus 100b of FIG. 16B may include the tuner 110, the image decoder 325, the processor 320, a first HDR processor 1610a, the picture-quality processor 635, a second HDR processor 1610b, and the display 180.

The tuner 110, the image decoder 325, and the processor 320 may be the same as each unit of FIGS. 2 and 3.

The processor 320 may transmit an HDR image and metadata to the first HDR processor 1610a.

The first HDR processor 1610a may include the image analyzer 610, the metadata analyzer 620, and the luminance mapping unit 630 of FIG. 6A.

The second HDR processor 1610b may include the image analyzer 610 and the color mapping unit 640 of FIG. 6A.

Alternatively, the first HDR processor 1610a may include the metadata analyzer 620 and the luminance mapping unit 630 of FIG. 6A. In this case, the processor 320 may include the image analyzer 610 of FIG. 6A.

The method of operating the image display apparatus according to the present invention may be implemented as a code that can be written on a processor readable recording medium provided in the image display apparatus and thus can be read by a processor. The recording medium includes all kinds of recording devices in which data is stored in a processor readable manner. Examples of the processor readable recording medium may include a ROM, a RAM, a CD-ROM, a magnetic tape, a floppy disc, and an optical data storage device. In addition, the processor readable medium is implemented in a carrier wave (e.g., data transmission over the Internet). In addition, the processor readable recording medium may be distributed in a computer system connected thereto via a network so that a processor readable code may be stored and executed in a distribution manner.

As is apparent from the above description, an image display apparatus according to an embodiment of the present invention includes a display, an image receiver to receive a high dynamic range (HDR) image, and a controller to set luminance information of an image to be displayed based on brightness information of the HDR image and information about a luminance that is displayable on the display and to perform control to display an image having a luminance adjusted based on the set image luminance information, thereby converting and displaying the HDR image so as to match the luminance that is displayable on the display.

When the dynamic range of the HDR image is greater than the dynamic range of a display panel, mapping for matching the dynamic range of the HDR image with the dynamic range of the display panel may be performed. Accordingly, an image that matches the intention of the creator of the HDR image may be displayed.

The controller may set color information of an image to be displayed based on color information of the HDR image and information about a color that is displayable on the display, and may perform control to display an image having a color adjusted based on the set image color information, thereby performing mapping corresponding to the information about a color that is displayable on the display. Accordingly, an image that matches the intention of the creator of the HDR image may be displayed.

The controller may set luminance information of an image to be displayed based on luminance setting input with respect to the image to be displayed, and may perform control to display an image having a luminance adjusted based on the set image luminance information. Accordingly, an image that matches the intention of the viewer may be displayed.

The controller may set color information of an image to be displayed based on color setting input with respect to the image to be displayed, and may perform control to display an image having a color adjusted based on the set image color information. Accordingly, an image that matches the intention of the viewer may be displayed.

The controller may set contrast information of an image to be displayed based on contrast setting input with respect to the image to be displayed, and may perform control to display an image having a contrast adjusted based on the set image contrast information. Accordingly, an image that matches the intention of the viewer may be displayed.

The controller may set luminance information of an image to be displayed on a per-image-scene or per-image-frame basis based on brightness information of the HDR image on a per-image-scene or per-image-frame basis and information about a luminance that is displayable on the display, and may perform control to display an image having a luminance adjusted on a per-image-scene or per-image-frame basis based on the set image luminance information. Accordingly, an image, the luminance of which is adjusted on a per-image-scene or per-image-frame basis, and which matches the intention of the creator of the HDR image, may be displayed.

The controller may set luminance information of an image to be displayed on a per-image-scene or per-image-frame basis based on luminance setting input with respect to the image to be displayed, and may perform control to display an image having a luminance adjusted on a per-image-scene or per-image-frame basis based on the set image luminance information. Accordingly, an image, the luminance of which is adjusted on a per-image-scene or per-image-frame basis, and which matches the intention of the creator of the HDR image, may be displayed.

The controller may extract maximum luminance information from the brightness information of the HDR image, and may perform control to vary a saturation section upon luminance setting based on the maximum luminance information. Accordingly, adaptive luminance adjustment of the HDR image is possible.

The controller may perform control to reduce the saturation section upon luminance setting as a maximum luminance level based on the maximum luminance information is increased.

The controller may perform control to reduce the saturation section upon luminance setting as a set luminance level based on the set luminance information is increased.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. An image display apparatus comprising:
a display;
an image receiver to receive a high dynamic range image; and
a controller to set luminance information of an image to be displayed based on brightness information of the high dynamic range image and information about a luminance that is displayable on the display and to perform control to display an image having a luminance adjusted based on the set image luminance information,
wherein the controller is configured to:
extract brightness information of the high dynamic range image,
extract maximum luminance information from the brightness information of the high dynamic range image, and
perform control to vary a saturation section upon luminance setting based on the maximum luminance information.

2. The image display apparatus according to claim 1, wherein the controller sets color information of an image to be displayed based on color information of the high dynamic range image and information about a color that is displayable on the display, and performs control to display an image having a color adjusted based on the set image color information.

3. The image display apparatus according to claim 1, further comprising an interface unit to receive luminance setting input with respect to an image to be displayed,
wherein the controller sets luminance information of an image to be displayed based on brightness information of the high dynamic range image, information about a luminance that is displayable on the display, and the luminance setting input, and performs control to display an image having a luminance adjusted based on the set image luminance information.

4. The image display apparatus according to claim 3, wherein the interface unit receives color setting input with respect to the image to be displayed, and
wherein the controller sets color information of an image to be displayed based on color information of the high dynamic range image, information about a color that is displayable on the display, and the color setting input, and performs control to display an image having a color adjusted based on the set image color information.

5. The image display apparatus according to claim 3, wherein the interface unit receives contrast setting input with respect to the image to be displayed, and
wherein the controller sets contrast information of an image to be displayed based on brightness information of the high dynamic range image, information about a color that is displayable on the display, and the contrast setting input, and performs control to display an image having a contrast adjusted based on the set image contrast information.

6. The image display apparatus according to claim 1,
wherein the controller sets luminance information of an image to be displayed on a per-image-scene or per-image-frame basis based on brightness information of the high dynamic range image on a per-image-scene or per-image-frame basis and information about a luminance that is displayable on the display, and performs control to display an image having a luminance adjusted on a per-image-scene or per-image-frame basis based on the set image luminance information.

7. The image display apparatus according to claim 1,
wherein the image receiver separates the high dynamic range image and metadata from an input image stream.

8. The image display apparatus according to claim 7,
wherein the controller includes:
an image analyzer to receive the high dynamic range image from the image receiver and to extract brightness information of the high dynamic range image;
a metadata analyzer to set a first lookup table for setting a luminance of an image to be displayed based on the brightness information of the high dynamic range image, luminance information of the high dynamic range image in the metadata, and information about a luminance that is displayable on the display; and
a luminance mapping unit to map luminance information of the image to be displayed based on the set first lookup table.

9. The image display apparatus according to claim 8,
wherein the metadata analyzer of the controller sets a second lookup table for setting a color of an image to be displayed based on color information of the high dynamic range image in the metadata and information about a color that is displayable on the display, and
wherein the controller further includes a color mapping unit to map color information of the image to be displayed based on the set second lookup table.

10. The image display apparatus according to claim 8,
wherein the metadata analyzer extracts maximum luminance information from the brightness information of the high dynamic range image, and performs control to vary the saturation section upon luminance setting based on the maximum luminance information.

11. The image display apparatus according to claim 7,
wherein the controller includes:
an image analyzer to receive the high dynamic range image from the image receiver and to extract brightness information of the high dynamic range image;
a metadata analyzer to set a first lookup table for setting a luminance of an image to be displayed based on luminance setting input, brightness information of the high dynamic range image, luminance information of the high dynamic range image in the metadata, and information about a luminance that is displayable on the display; and
a luminance mapping unit to map luminance information of the image to be displayed based on the set first lookup table.

12. The image display apparatus according to claim 11,
wherein the metadata analyzer extracts set luminance information depending on the luminance setting input and maximum luminance information from the brightness information of the high dynamic range image, and performs control to vary the saturation section upon luminance setting based on the maximum luminance information and the set luminance information.

13. The image display apparatus according to claim 12,
wherein the metadata analyzer performs control to reduce the saturation section upon luminance setting as a maximum luminance level based on the maximum luminance information is increased.

14. The image display apparatus according to claim 12,
wherein the metadata analyzer performs control to reduce the saturation section upon luminance setting as a set luminance level based on the set luminance information is increased.

15. The image display apparatus according to claim 1,
wherein the controller includes:
an image analyzer to receive the high dynamic range image from the image receiver and to extract brightness information of the high dynamic range image;
a metadata analyzer to set a lookup table for setting a luminance and a color of an image to be displayed based on the brightness information of the high dynamic range image, luminance information of the high dynamic range image in the metadata, information about a luminance that is displayable on the display, color information of the high dynamic range image in the metadata, and information about a color that is displayable on the display; and
a luminance and color gamut mapping unit to map luminance information and color information of the image to be displayed based on the set lookup table.

16. An image display apparatus comprising:
a display;
an image receiver to receive a high dynamic range image;
an interface unit to receive luminance setting input with respect to an image to be displayed; and
a controller to set luminance information of an image to be displayed based on brightness information of the high dynamic range image, information about a luminance that is displayable on the display, and the luminance setting input, and to perform control to display an image having a luminance adjusted based on the set image luminance information,
wherein the controller is configured to:
extract set luminance information depending on the luminance setting input and maximum luminance information from the brightness information of the high dynamic range image,
perform control to vary a saturation section upon luminance setting based on the maximum luminance information and the set luminance information, and
perform control to decrease the saturation section upon luminance setting as a set luminance level as the luminance setting input increases.

17. The image display apparatus according to claim 16,
wherein the controller sets color information of an image to be displayed based on color information of the high dynamic range image and information about a color that is displayable on the display, and performs control to display an image having a color adjusted based on the set image color information.

18. The image display apparatus according to claim 17,
wherein the controller includes:
an image analyzer to receive the high dynamic range image from the image receiver and to extract brightness information of the high dynamic range image;
a metadata analyzer to set a first lookup table for setting a luminance of an image to be displayed based on the luminance setting input, the brightness information of the high dynamic range image, luminance information of the high dynamic range image in the metadata, and information about a luminance that is displayable on the display; and a luminance mapping unit to map luminance information of the image to be displayed based on the set first lookup table.

19. The image display apparatus according to claim 18, wherein the metadata analyzer of the controller sets a second lookup table for setting a color of an image to be displayed based on color information of the high dynamic range image in the metadata and information about a color that is displayable on the display, and wherein the controller further includes a color mapping unit to map color information of the image to be displayed based on the set second lookup table.

20. The image display apparatus according to claim 16, wherein the controller sets luminance information of an image to be displayed on a per-image-scene or per-image-frame basis based on brightness information of the high dynamic range image on a per-image-scene or per-image-frame basis, information about a luminance that is displayable on the display, and the luminance setting input, and performs control to display an image having a luminance adjusted on a per-image-scene or per-image-frame basis based on the set image luminance information.

* * * * *